(12) United States Patent
Takanashi

(10) Patent No.: US 7,426,339 B2
(45) Date of Patent: Sep. 16, 2008

(54) WATERPROOF HOUSING

(75) Inventor: Tatsuo Takanashi, Hachioji (JP)

(73) Assignee: Olympus Corporation (JP)

( * ) Notice: Subject to any disclaimer, the term of this patent is extended or adjusted under 35 U.S.C. 154(b) by 301 days.

(21) Appl. No.: 11/291,139

(22) Filed: Nov. 30, 2005

(65) Prior Publication Data

US 2006/0177206 A1 Aug. 10, 2006

(30) Foreign Application Priority Data

Nov. 30, 2004 (JP) ............................ 2004-347227
Jan. 18, 2005 (JP) ............................ 2005-010887

(51) Int. Cl.
*G03B 17/08* (2006.01)

(52) U.S. Cl. ............................ 396/27; 396/25; 396/26; 396/28; 396/29; 348/81; 359/507; 359/508; 359/512; 359/513; 359/514; 206/316.2

(58) Field of Classification Search ............ 396/25–29, 396/72; 348/81; 206/316.2, 811; 352/242, 352/507, 512, 513; 359/507, 512, 513, 508, 359/514

See application file for complete search history.

(56) References Cited

U.S. PATENT DOCUMENTS 5,070,348 A * 12/1991 Hayakawa et al. ............ 396/26
5,077,567 A * 12/1991 Haraguchi et al. ............ 396/29
5,701,518 A * 12/1997 Honda et al. ................... 396/29
5,822,622 A * 10/1998 Inoue ............................ 396/27
6,532,338 B1 * 3/2003 Nemoto et al. ............... 386/117
7,082,264 B2 * 7/2006 Watanabe et al. ............. 396/28
2005/0115852 A1 * 6/2005 Funahashi et al. ......... 206/316.2
2005/0117897 A1 * 6/2005 Funahashi et al. ............. 396/27
2005/0152689 A1 * 7/2005 Akabane et al. ............... 396/87
2006/0008262 A1 * 1/2006 Watanabe et al. ............. 396/25

FOREIGN PATENT DOCUMENTS

JP                 55127541 A     * 10/1980

* cited by examiner

*Primary Examiner*—W. B. Perkey
*Assistant Examiner*—Anthony Weathers
(74) *Attorney, Agent, or Firm*—Ostrolenk, Faber, Gerb & Soffen, LLP

(57) ABSTRACT

A waterproof housing for storing a camera with a lens barrel includes, a cylindrical lens barrel storage section for storing the lens barrel portion with a through hole communicating the outside and inside of the waterproof housing; and a rotatable cylindrical operation ring supported on an outer periphery of the cylindrical lens barrel storage section and provided to enclose an outer periphery of a rotary ring on the stored lens barrel for rotating the same. The waterproof housing also includes a transmitting member in the hole on an outer wall of the cylindrical lens barrel storage section connected to the rotary ring for directly transmitting rotation of the operation ring thereto, and a waterproof member between the outside of the cylindrical lens barrel storage section and an inner periphery of the operation ring for waterproof between the interior and the exterior of the cylindrical lens barrel storage section.

11 Claims, 15 Drawing Sheets

WATERPROOF HOUSING

CROSS-REFERENCE TO RELATED APPLICATION

This application is based upon and claims the benefit of priority from prior Japanese Patent Application Nos. 2004-347227, filed Nov. 30, 2004, and 2005-10887, filed Jan. 18, 2005, the entire contents of which are incorporated herein by reference.

BACKGROUND OF THE INVENTION

1. Field of the Invention

The present invention relates to a waterproof housing for storing a camera with a lens barrel.

2. Description of the Related Art

In order to enable underwater photography with a camera, a waterproof housing for storing the camera in a watertight manner is commercialized in the related art.

The waterproof housing includes, for example, two case members supported by a hinge so as to be capable of opening and closing, and is adapted to position and store the camera in the case members in a state in which the hinge is opened, and to be brought into a watertight manner by closing the two case members after the storage. The waterproof housing includes various operating members for enabling various operations relating to the camera in a state of being stored therein.

When the camera is of a single-lens reflex type, for example, operation relating to lens barrel is generally possible. More specifically, there is a lens barrel having operation rings such as a focus ring for adjusting a focal position of a photographic lens stored in the lens barrel, a zoom ring for adjusting a focal distance. The waterproof housings configured to enable operation of such operation rings on the lens barrel are proposed in the related art.

For example, Japanese Utility Model Registration No. 3094807 discloses a focus adjustment device which enables adjustment of the lens focus from the outside. The focus adjustment device enables rotation of the lens barrel for focus adjustment from the outside of a waterproof case. More specifically, a barrel-side magnet is secured on an outer peripheral portion of the lens barrel, and a rotatable case-side magnet is arranged on an outer peripheral portion of the waterproof case at a position corresponding to the barrel-side magnet. When a user rotates the case-side magnet for adjusting the focus, the barrel-side magnet is rotated together by the effect of attraction thereof, whereby the focus adjustment of the lens barrel is achieved.

According to the focus adjustment device disclosed in Japanese Utility Model Registration No. 3094807, the focus adjustment can be achieved by operating the lens barrel without opening the waterproof case.

A technique for adjusting the focus of the lens barrel from the outside of the waterproof camera case with a force of magnet is disclosed in JP-A-10-123602.

BRIEF SUMMARY OF THE INVENTION

A waterproof housing in the present invention is for storing a camera having a lens barrel. The waterproof housing includes a cylindrical lens barrel storage section for storing the lens barrel portion and being formed with a through hole which communicates the outside and the inside of the waterproof housing and a rotatable cylindrical operation ring supported on an outer periphery of the cylindrical lens barrel storage section and provided so as to enclose an outer periphery of a rotary ring on the stored lens barrel for rotating the same. The waterproof housing also includes a transmitting member provided in the hole formed on an outer peripheral wall of the cylindrical lens barrel storage section to be connected to the rotary ring for directly transmitting rotation of the operation ring thereto, and a waterproof member provided between the outside of the cylindrical lens barrel storage section and an inner periphery of the operation ring for achieving waterproof between the inside and the outside of the cylindrical lens barrel storage section.

In the waterproof housing, a pair of waterproof members can be provided as the waterproof member, and the pair of waterproof members can be arranged longitudinally of the cylindrical lens barrel storage section so as to sandwich the hole.

In the waterproof housing, the transmitting member can be a rotary member and can be arranged in the hole so as to be rotated in contact with the rotary ring and the operation ring.

In the waterproof housing according to claim 1, the transmitting member can be provided on the operation ring so as to rotate with the operation ring in contact with the rotary ring.

For example, a waterproof housing of the present invention is a waterproof housing for storing a camera having a lens barrel, including a cylindrical lens barrel storage section for storing a portion of the lens barrel, and a rotatably cylindrical operation ring supported on an outer periphery of the cylindrical lens barrel storage section and having an axis of rotation in parallel with an axis of rotation of the rotary ring for rotating the rotary ring of the lens barrel stored therein. In the waterproof housing, a rotation transmitting member provided in the hole formed on the outer peripheral wall of the cylindrical lens barrel storage section in parallel with the axis of rotation of the operation ring and the axis of rotation of the rotary ring so as to be rotatable for transmitting rotation of the operation ring to the rotary ring by being in abutment with an outer periphery of the rotary ring and an inner periphery of the operation ring and a waterproof member provided between the outside of the cylindrical lens barrel storage section and the inner periphery of the operation ring for achieving waterproof between the inside and the outside of the cylindrical lens barrel storage section can be provided.

In this case, the rotation transmitting member can be formed of a cylindrical rubber member.

The rotation transmitting member can include one cylindrical member formed of a rubber member and two pulleys, and is configured to support the inner periphery of the one cylindrical member by the two pulleys so that the one cylindrical member rotates around the two pulleys, and the rotary ring is rotated by an outer periphery of the one cylindrical member.

As another example, a waterproof housing of the present invention is a waterproof housing for storing an apparatus provided with a lens barrel having an operation ring including a storage section for storing the lens barrel, a lens barrel storage section having a through hole extending along the direction of operation of the operation ring at a position corresponding to the operation ring of the lens barrel in a stored state and a ring member arranged on an outer periphery of the lens barrel storage section so as to be rotatable. In the waterproof housing, a press-contact member arranged on the ring member and adapted to assume a press-contact position which achieves abutment with the operation ring through the through hole and a separate position apart from the operation ring, a first waterproof member arranged between the lens barrel storage section and the ring member for preventing water from entering the waterproof housing through the through hole, and a second waterproof member provided between the press-contact member and the ring member for preventing water from entering the waterproof housing from the through hole.

In this case, an urging member disposed between the ring member and the press-contact member for constantly urging the press-contact member in the direction to come into abutment with the operation ring can further be provided.

It is also possible to further provide a locating member for positioning the press-contact member at one of the press-contact position and the separate position.

Alternatively, an urging member disposed between the ring member and the press-contact member for constantly urging the press-contact member in the direction to come apart from the operation ring can further be provided.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
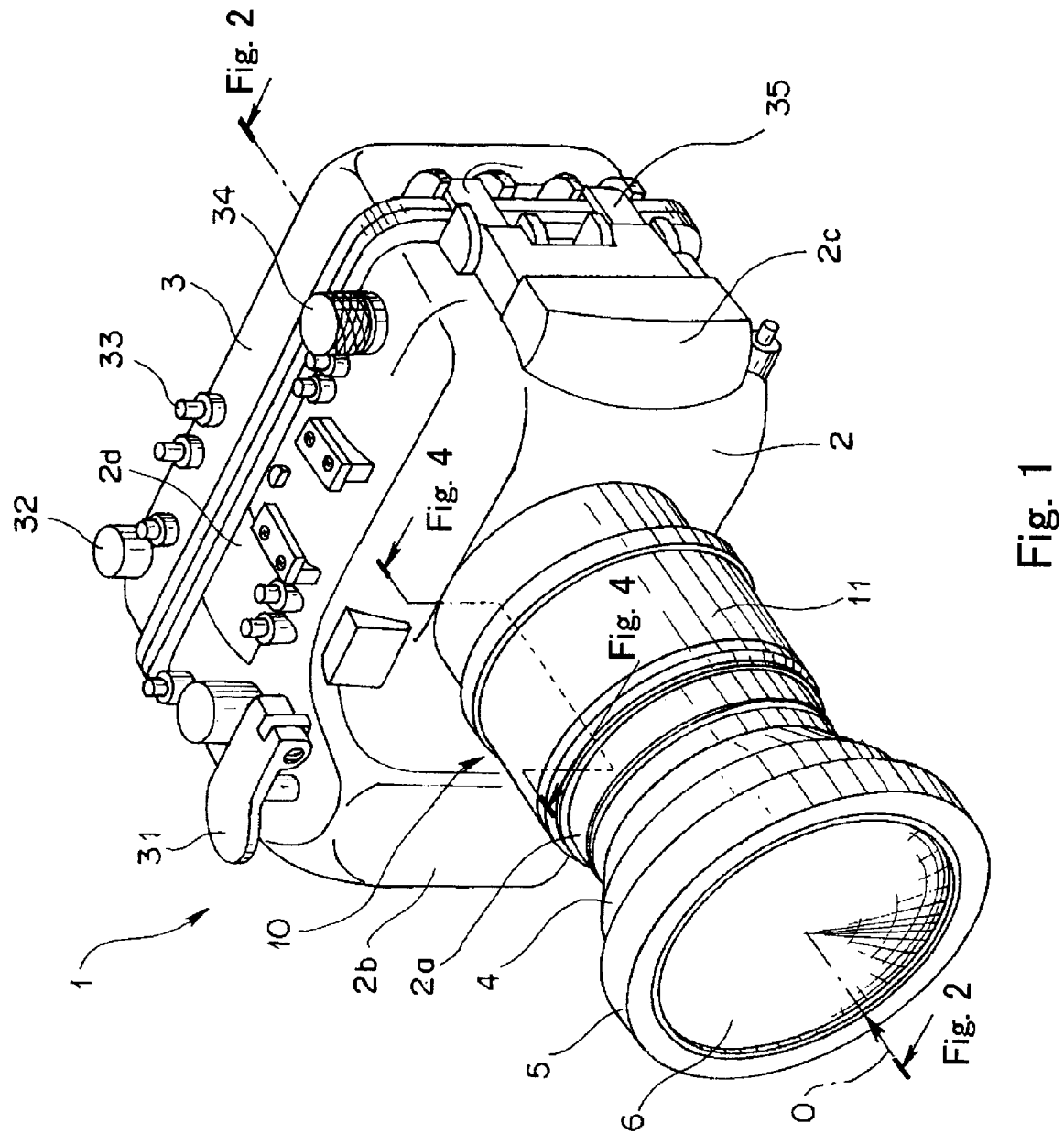
FIG. 1 is a perspective view showing an appearance of a state in which a camera is stored in a waterproof housing in a first embodiment of the present invention.
Figure 2:
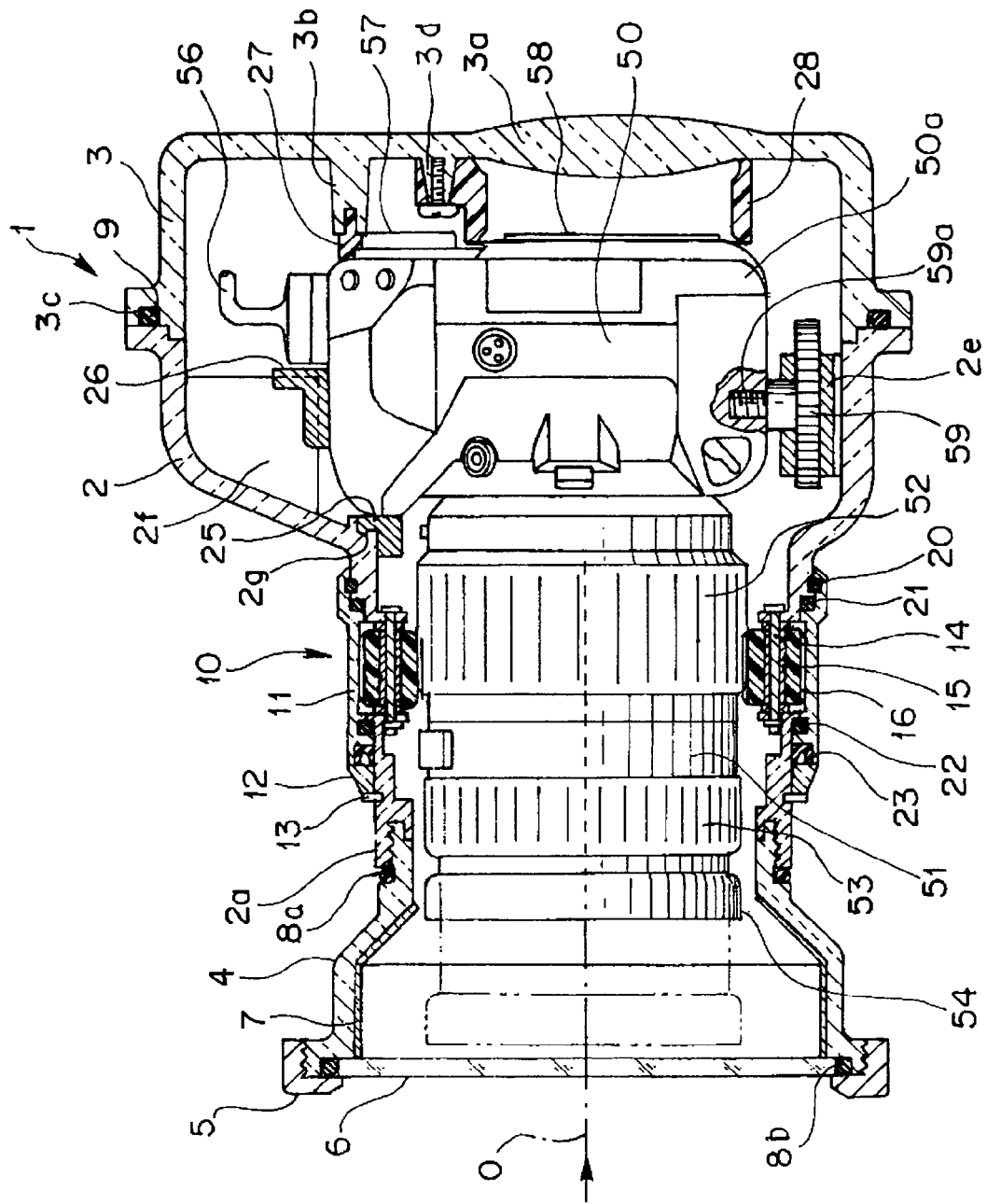
FIG. 2 is a cross-sectional view of FIG. 1, showing a state in which the camera is stored in the waterproof housing in FIG. 1.
Figure 3:
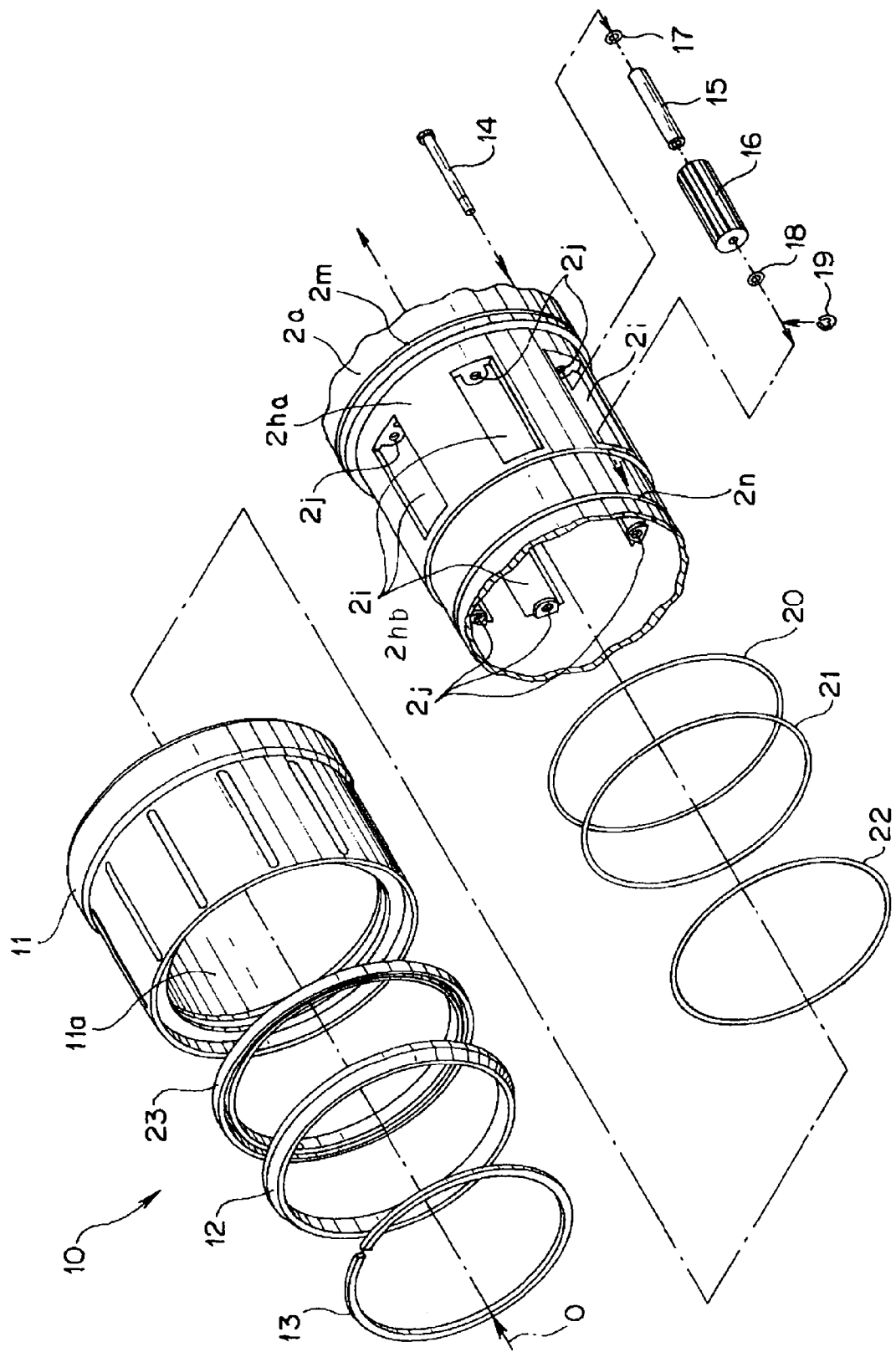
FIG. 3 is an exploded perspective view of a cylindrical barrel storage section (a rotation transmitting mechanism unit is included) of the waterproof housing in FIG. 1.
Figure 4:
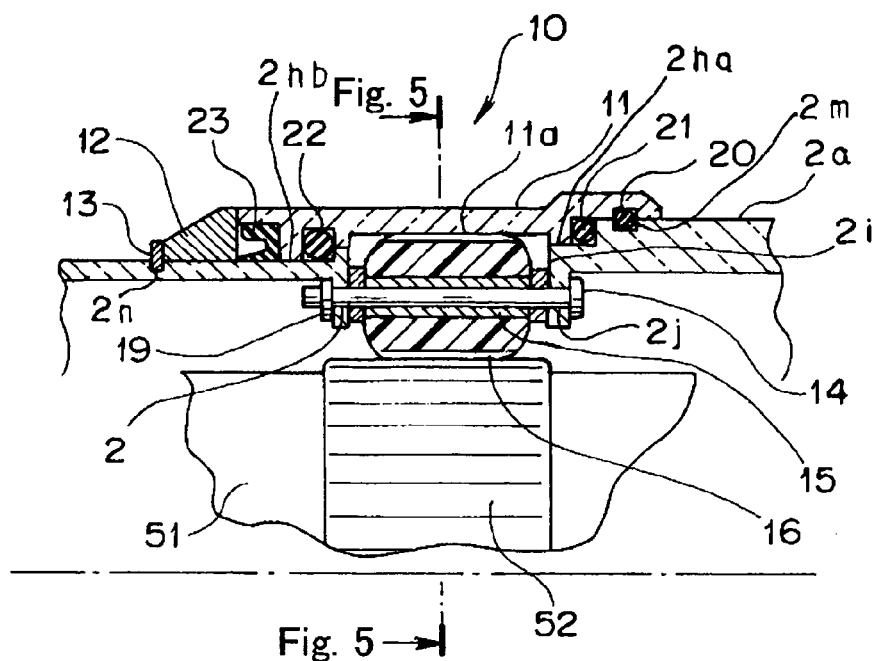
FIG. 4 is a cross-sectional view of FIG. 1 taken along an optical axis of the cylindrical barrel storage section.
Figure 5:
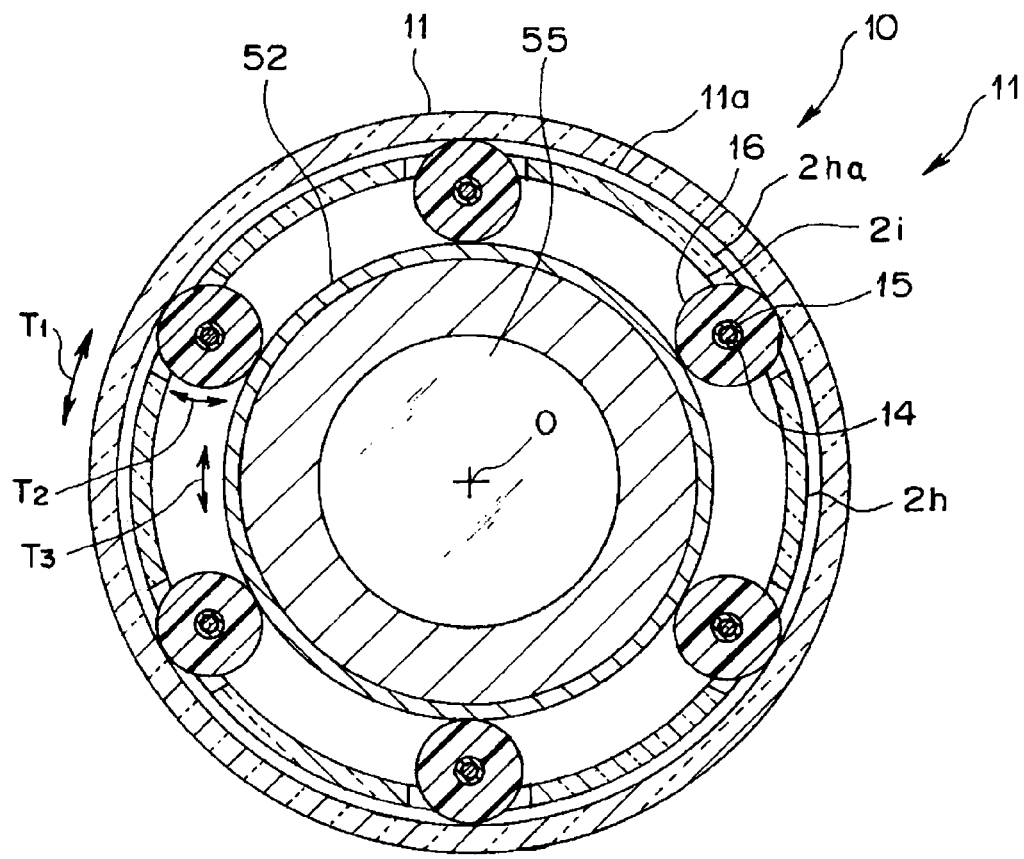
FIG. 5 is a cross-sectional view of FIG. 4, taken along a line orthogonal to the optical axis of the cylindrical lens barrel storage section.
Figure 6A:
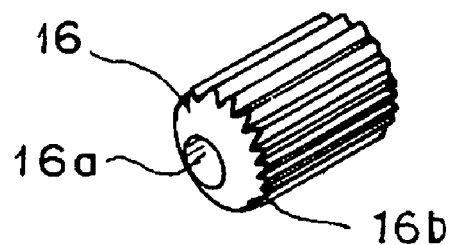
FIG. 6A is a perspective view showing a shape of a rubber roller in the rotation transmitting mechanism unit to be built in the cylindrical barrel storage section in FIG. 3.
Figure 6B:
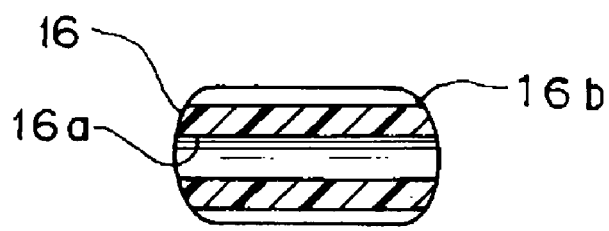
FIG. 6B is a cross-sectional view of the rubber roller.

FIG. 1 is a perspective view showing an appearance of a state in which a camera is stored in a waterproof housing in a first embodiment of the present invention. FIG. 2 is a cross-sectional view of FIG. 1, showing a state in which the camera is stored in the waterproof housing. FIG. 3 is an exploded perspective view of a cylindrical barrel storage section (a rotation transmitting mechanism unit is included) of the waterproof housing. FIG. 4 is a cross-sectional view of FIG. 1 taken along an optical axis of the cylindrical barrel storage section. FIG. 5 is a cross-sectional view of FIG. 4, taken along a line orthogonal to the optical axis of the cylindrical lens barrel storage section. FIGS. 6A and 6B are drawings showing a shape of a rubber roller in the rotation transmitting mechanism unit to be built in the cylindrical barrel storage section, in which FIG. 6A is a perspective view of the rubber roller, and FIG. 6B is a cross-sectional view of the rubber roller.

In the description below, an optical axis of a photographic lens of the camera to be stored is represented as an optical axis O, the side of a photographic subject is assumed to be the front side, and the side of image formation is assumed to be the rear side. The rotational direction and the left and right directions of the respective members are represented by directions viewed from the front side.

A waterproof housing 1 according to the first embodiment of the present invention is for storing a camera 50 in a waterproofed state as shown in FIG. 2 for enabling photographing and reproducing under water, and various operating members for operating the camera 50 are arranged in a state of being exposed on the outside as shown in FIG. 1.

Description will be made first for the camera 50. As shown in FIG. 2, the camera 50 is a single-lens reflex camera, and a replaceable lens barrel 51 is mounted to a front surface of a camera body 50a. The camera body 50a includes a release button, a mode selection dial, a flash emitting section, an LCD display section (not shown), and a synchro-cord 56, etc., on an upper surface thereof. Arranged on a back surface thereof are a finder window 57, an LCD display section (monitor) 58, and so on. On the left side thereof, a grip portion (not shown) is provided.

The lens barrel 51 is provided with a zoom ring 52 and a focus ring 53 as rotary rings which can be rotated about the optical axis O on an outer peripheral portion of the cylinder, and includes a lens barrel frame 54 being capable of moving in the fore-and-aft direction and having a photographic lens 55 thereon. With the lens barrel 51, zooming operation of the lens barrel is achieved by rotating the zoom ring 52. When the focus ring 53 is rotated, manual focusing is achieved. However, in a state of being stored in the waterproof housing 1, the focus ring 53 is not operated, and focusing is achieved by auto-focus control. The zoom ring 52 is rotationally driven by rotating an operation ring 11, described later, provided on the waterproof housing 1, whereby zooming of the lens barrel 51 is achieved.

The waterproof housing 1 includes a front case 2 and a rear case 3 formed of transparent resin material supported so as to be capable of opening and closing by a hinge member (not shown) arranged on a left end as shown in FIGS. 1 and 2. The front and rear cases 2, 3 are closed in a state in which the camera 50 is stored, and are engaged and kept closed with a buckle 35 arranged on a right end. In the closed state, the front case 2 and the rear case 3 are hermetically closed at the mating surfaces thereof by an annular packing 9 inserted into a groove 3c on the rear case and maintained in a watertight state.

The front case 2 has a cylindrical barrel storage section (more specifically, cylindrical lens barrel storage section) 2a projecting toward the front, and provided with a release button operating lever 31, and an external flash connecting terminal cap 34 arranged on an upper surface thereof, and is provided with a data display LCD magnification lens 2d. In the interior thereof, a rib 2f and a recess 2g for fitting abutment rubbers 26, 25 for holding the upper surface and the front surface of the camera body 50a of the stored camera are arranged, and a tripod stand screw supporting portion 2e for fitting a tripod stand screw 59 is provided on an inner surface of a bottom portion thereof. Disposed on the left and right of the front case 2 are grip members 2c, 2b.

The rear case 3 includes a mode setting rotary button 32 and a push button 33 on an upper surface thereof, and an image LCD magnification lens 3a on a rear surface thereof. A projection 3b on which an abutment rubber 27 which comes into abutment with an upper portion of the finder window is fitted and a projection 3d for fixing a hood 28 which surrounds the periphery of the image LCD display section are provided inside a rear surface thereof.

When storing the camera 50 in the waterproof housing 1, the camera 50 is inserted into the front case 2, the tripod stand screw 59 inserted into the tripod stand screw supporting portion 2e is screwed into a tripod stand screw portion of the camera body 50a, and the front case 2 and the rear case 3 are closed to the stored state as described above. In a state in which the camera 50 is stored in this manner, the camera body 50a of the camera 50 is positioned and fixed by the tripod stand screw 59 in a state of being pressed by the abutment rubbers 25, 26, 27, and the lens barrel 51 is correctly positioned in the cylindrical barrel storage section 2a. In other words, the camera 50 is positioned in a state in which an axial center of the cylindrical barrel storage section 2a matches the optical axis O.

A lens hood 4 formed of transparent resin and provided with a rubber ring attached to an inner periphery thereof is screwed into a distal end of the cylindrical barrel storage section 2a of the front case 2 with the intermediary of an O-ring 8a. In addition, at a front end of the lens hood 4 is provided with a front glass 6, and the front glass 6 is fixed by a holding ring 5 with the intermediary of an O-ring 8b. A joint portion between the Lens hood 4 and the cylindrical barrel storage section 2a is hermetically closed by the O-rings 8a, 8b.

The cylindrical barrel storage section 2a is provided with a rotation transmitting mechanism unit 10 for rotating the zoom ring 52 of the lens barrel 51, and the zoom ring 52 is positioned on the inner peripheral portion thereof. As shown in FIGS. 3 and 4, the cylindrical barrel storage section 2a is formed with a waterproof O-ring groove 2m and an outer peripheral portion 2ha which is an outer peripheral wall formed by a shoulder (small diameter side), an outer peripheral portion 2hb formed by a shoulder (smaller diameter side), and a C-ring groove 2n from the side of mounting the barrel. Provided on the outer peripheral portion 2ha are six openings 2i as holes for communicating the inside and outside at six positions at regular intervals in the circumference direction, and shaft supporting holes 2j extending in parallel with the direction of the optical axis O are provided at both ends of the opening in the direction of the optical axis O on the inner peripheral side so as to oppose to each other.

On the other hand, the rotation transmitting mechanism unit 10 is fitted on the outer peripheral portion 2ha of the cylindrical barrel storage section 2a and includes a cylindrical operation ring 11 which can be rotated about the optical axis O, supporting shafts 14 which are members composed of six sets and extending in parallel with the optical axis O (that is, in parallel with the axes of rotation of the zoom ring 52 and the operation ring 11), sleeves 15 for being rotatably fitted on the supporting shafts 14, rubber rollers 16 as rotation transmitting members to be fixedly fitted on outer peripheries of the sleeves 15, washers 17, 18 and stop rings 19 to be abutted with both ends of the sleeves 15, a thrust ring 12 for constraining the thrust positions of the operation ring 11, a C-ring 13, and O-rings 20, 21, 22 and a water-proof seal 23 as a waterproof portion.

The rubber roller 16 has an axial hole 16a and is formed into a column shape formed on an outer periphery thereof with ridges in the direction along the axial hole at predetermined pitches, each ridge having an angular cross section as shown in FIG. 6A and FIG. 6B.

Six sets of the rubber rollers 16 in a state in which the sleeves 15 are fitted into the axial holes 16a are fitted into the respective openings 2i with the washers 17, 18 fitted on both ends and rotatably supported respectively by the supporting shafts 14 inserted through the shaft supporting holes 2j extending in the direction parallel with the optical axis O. Distal ends of the supporting shafts 14 are locked by the stop rings 19, whereby the supporting shafts 14 are prevented from dropping off. In this supported state, the outer diameter surface of the rubber roller 16 is supported in a state of being protruded outward from the outer peripheral portion 2ha of the cylindrical barrel storage section 2a by a predetermined amount.

The cylindrical barrel storage section 2a is fitted with the O-ring 20 in the O-ring groove 2m, the O-ring 21 in the outer peripheral portion 2ha, and the O-ring 22 on the outer peripheral portion 2hb, respectively, and the operation ring 11 is fitted on the outer peripheral portion 2ha in a state in which the O-rings are interposed. The waterproof seal 23 is fitted to an inner periphery of a front end portion of the operation ring 11, and the openings 2i are maintained in a watertight state with respect to the outside.

The thrust ring 12 to be fitted on the outer peripheral portion 2hb is in abutment with a front end surface of the operation ring 11 in a state in which the waterproof seal 23 is held down, and the thrust ring 12 is constrained from the movement toward the front in the direction of the optical axis O by the C-ring 13. Therefore, the operation ring 11 is constrained from the fore-and-aft movement in the direction of the optical axis O by the thrust ring 12 and the shoulder of the outer peripheral portion 2ha of the cylindrical barrel storage section 2a.

In the above-described assembled state, the outer peripheries (angular portions) of the rubber rollers 16 are resiliently deformed and come into abutment with an inner peripheral surface 11a of the operation ring 11 in a state of frictional contact therewith as shown in FIG. 5. On the other hand, on an inner side of the cylindrical barrel storage section 2a, the outer peripheries (angular portions) of the rubber rollers 16 are resiliently deformed, and come into abutment with an outer periphery of the zoom ring 52 of the storage lens barrel 51 in a state of frictional contact therewith. Since the rubber ring is fitted on the outer periphery of the zoom ring 52, the rubber rollers 16 come into abutment therewith via the rubber ring, and hence a force of frictional rotation is efficiently transmitted.

A state of zooming operation of the lens barrel 51 in a state in which the camera 50 is stored in the waterproof housing 1 having the above-described structure will be described.

When the operation ring 11 is rotated in either direction as indicated by T1 in FIG. 5 in the state in which the camera is stored, the rotational force is frictionally transmitted to the rubber rollers 16 via the inner peripheral surface 11a of the operation ring 11, and the rubber rollers 16 are rotated in the directions indicated by T2. The rotational force of the rubber rollers 16 is frictionally transmitted to the zoom ring 52 with which the rubber rollers 16 are in abutment therewith, and the zoom ring 52 is rotated in the direction T3 which is opposite from the direction T1. When the rotation of the operation ring 11 is transmitted to the zoom ring 52, the photographic lens 55 of the lens barrel 51 is moved back and forth to the respective zoom positions to achieve zooming.

According to the waterproof housing 1 of this embodiment, the zoom ring 52 of the lens barrel 51 of the stored camera can be rotated via the rotation transmitting mechanism unit 10 without slippage by rotating the operation ring 11 from the outside of the housing, whereby the reliable zooming is achieved, and the structure of the rotation transmitting mechanism unit 10 is simple.

The inside and the outside of the openings 2j of the cylindrical barrel storage section 2a with the operation ring 11 and the rubber rollers 16 arranged in the rotatable manner are kept in a reliable watertight state by the O-rings 20, 21, 22 and the waterproof seal 23 arranged between an inner periphery of the operation ring 11 and the outer peripheral portions 2ha, 2hb of the cylindrical barrel storage section 2a.

Although the six sets of the supporting shafts 14, the sleeves 15, and the rubber rollers 16 are used as the rotation transmitting mechanism unit 10 in the waterproof housing 1 in the above-described embodiment, the invention is not limited thereto, and a structure in which three sets of the supporting shafts 14, the sleeves 15, and the rubber rollers 16 are arranged at positions at three regular intervals on the outer peripheral portion 2ha of the cylindrical barrel storage section 2a may also be employed.

Subsequently, a modification of the rubber roller 16 applied to the waterproof housing 1 according to the first embodiment will be described using FIG. 7A, FIG. 7B, FIG. 8A and FIG. 8B.

Figure 7A:
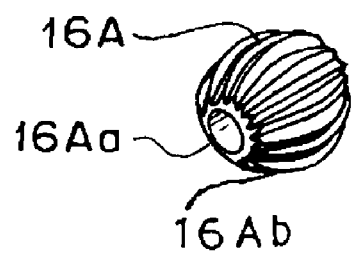
FIG. 7A is a perspective view showing the shape of the rubber roller according to a modification of the rubber roller shown in FIG. 6A and FIG. 6B.
Figure 7B:
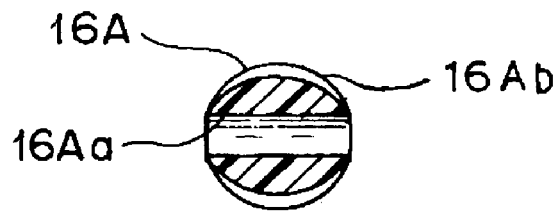
FIG. 7B is a cross-sectional view of the rubber roller according to the modification.
Figure 8A:
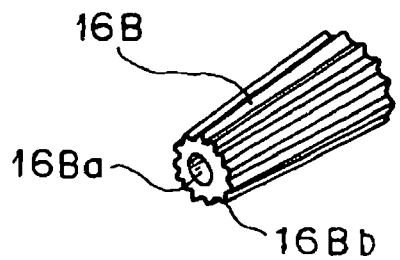
FIG. 8A is a perspective view showing the shape of the rubber roller according to another modification of the rubber roller in FIG. 6.
Figure 8B:
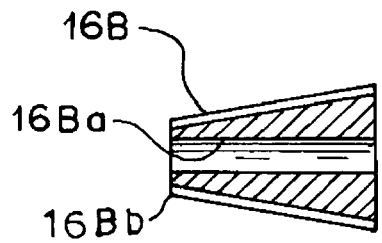
FIG. 8B is a cross-sectional view of the rubber roller according to the modification in FIG. 8A.

FIG. 7A and FIG. 7B show a shape of a rubber roller according to a modification of the rubber roller 16. FIG. 7A is a perspective view and FIG. 7B is a cross-sectional view. FIG. 8A and FIG. 8B show a shape of a rubber roller according to another modification of the rubber roller 16. FIG. 8A is a perspective view, and FIG. 8B is a cross-sectional view.

A rubber roller 16A according to the modification includes an axial hole 16Aa as in the case of the rubber roller 16, and has a spherical outer shape having ridges of angular shape in cross section along the axial direction at predetermined pitches on the outer periphery thereof. As in the case of the rubber rollers 16, a rubber roller 16B of another modification has an axial hole 16Ba, and also has a truncated conical outer shape having ridges extending along the axial direction and having angular shape in cross section at predetermined pitches on the outer periphery thereof. A smaller diameter side 16Bb is mounted toward the camera body 50a.

The rubber rollers 16A, 16B according to the modifications are each rotatably supported in the opening 2i of the cylindrical barrel storage section 2a via the supporting shaft as in the case of the rubber rollers 16. The frictional abutment state with respect to the operation ring 11 and the zoom ring 52 is the same as in the case of the rubber roller 16.

In the waterproof housing to which the rubber rollers 16A, 16B in these modifications are applied, the same advantages as the case of the waterproof housing 1 are achieved. In particular, in the case of this modification, since the angular cross sections of the rubber rollers are apt to be resiliently deformed, relatively hard rubber can be applied, and hence improved durability is expected.

A relatively large curved surface 16b is formed on the outer peripheral portion on both end surfaces of the rubber roller 16 in the first embodiment, and the rubber roller 16A as the modification has the outer shape of a spherical surface 16Ab. Therefore, when the lens barrel 51 is stored in the cylindrical barrel storage section 2a of the waterproof housing 1, insertion of the barrel 51 can be achieved easily by preventing the rubber rollers 16, 16A from being caught by the zoom ring (rubber ring) 52. On the other hand, when the rubber ring 16B of another embodiment is applied, since the rubber ring 16B has the truncated conical outer shape, insertion of the lens barrel 51 is further facilitated.

It is also possible to apply synthetic resin which is higher in frictional coefficient as well as natural rubber or synthetic rubber as a material of the rubber rollers 16, 16A, 16B described above.

Figure 9:
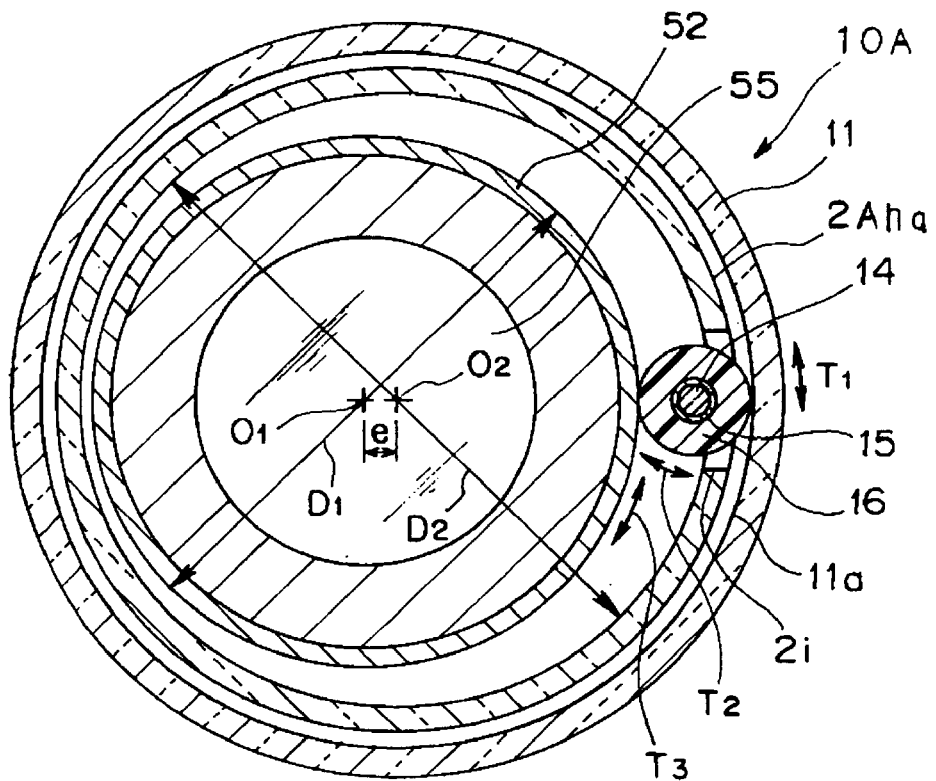
FIG. 9 is a cross-sectional view orthogonal to the optical axis of the cylindrical barrel storage section to which the modification to the rotation transmitting mechanism unit to be built in the cylindrical barrel storage section in FIG. 3 is applied.

Referring now to FIG. 9, a modification of the rotation transmitting mechanism unit 10 which is applied to the waterproof housing in the first embodiment of the present invention will be described.

FIG. 9 is a cross-sectional view taken along the line orthogonal to the optical axis of the cylindrical barrel storage section to which the rotation transmitting mechanism unit in the modification is applied.

In a cylindrical barrel storage section 2Aa to which the rotation transmitting mechanism unit 10A of this modification is applied, the camera is mounted to the waterproof housing in a state in which an optical axis O1 of the zoom ring 52 of the lens barrel 51 is decentered from a center O2 of the cylindrical barrel storage section 2Aa by a predetermined amount of eccentricity e. In addition, a rotation transmitting mechanism unit 10A is configured in such a manner that a set of the supporting shaft 14, the sleeve 15, and the rubber roller 16 are arranged at one position of the opening 2i of an outer peripheral portion 2Aha which is the outer peripheral wall of the cylindrical barrel storage section 2Aa. An inner diameter D2 of the outer peripheral portion 2Aha is larger than an outer diameter D1 of the zoom ring 52 by an amount corresponding to the gap where the single rubber roller 16 is arranged. Other structures are the same as the structures of the first embodiment.

Transmission of the rotational force from the operation ring 11 to the zoom ring 52 in the waterproof housing to which the rotation transmitting mechanism unit 10A is applied is the same as in the case of the first embodiment. However, in this waterproof housing, the lens barrel 51 is cantilevered and rotated by the waterproof housing.

According to the waterproof housing to which the rotation transmitting mechanism unit 10A of this modification is applied, only one set of the supporting shaft 14, the sleeve 15, and the rubber roller 16 is necessary to use, and hence the structure is simplified, and the diameter of the cylindrical barrel storage section 2Aa of the waterproof housing is reduced, whereby downsizing is enabled. By applying the rubber roller 16B described above, storage of the camera, that is, insertion of the lens barrel 51 into the cylindrical barrel storage section 2Aa is further facilitated.

Figure 10:
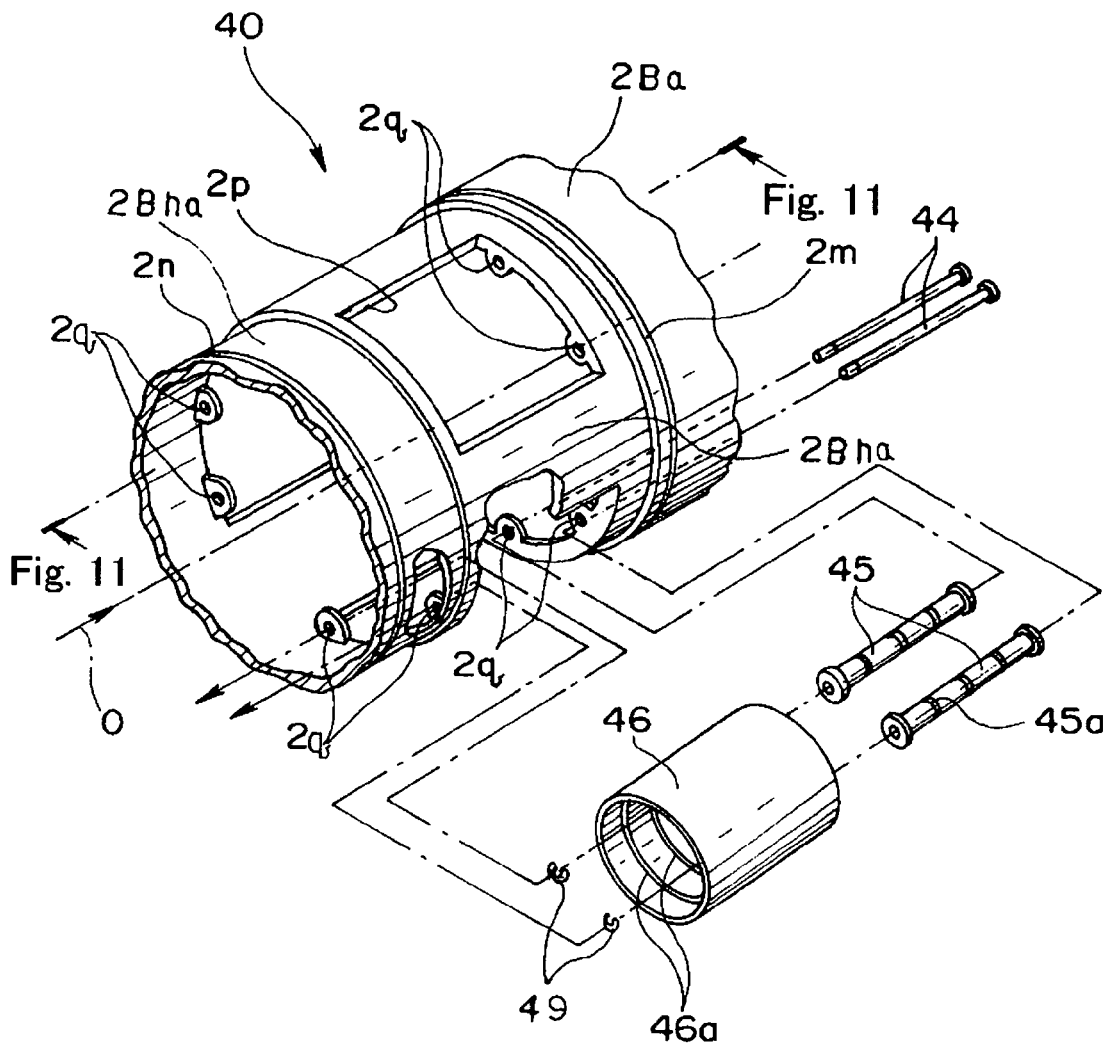
FIG. 10 is an exploded perspective view of the cylindrical barrel storage section (including the rotation transmitting mechanism unit) of a waterproof housing according to a second embodiment of the present invention.
Figure 11:
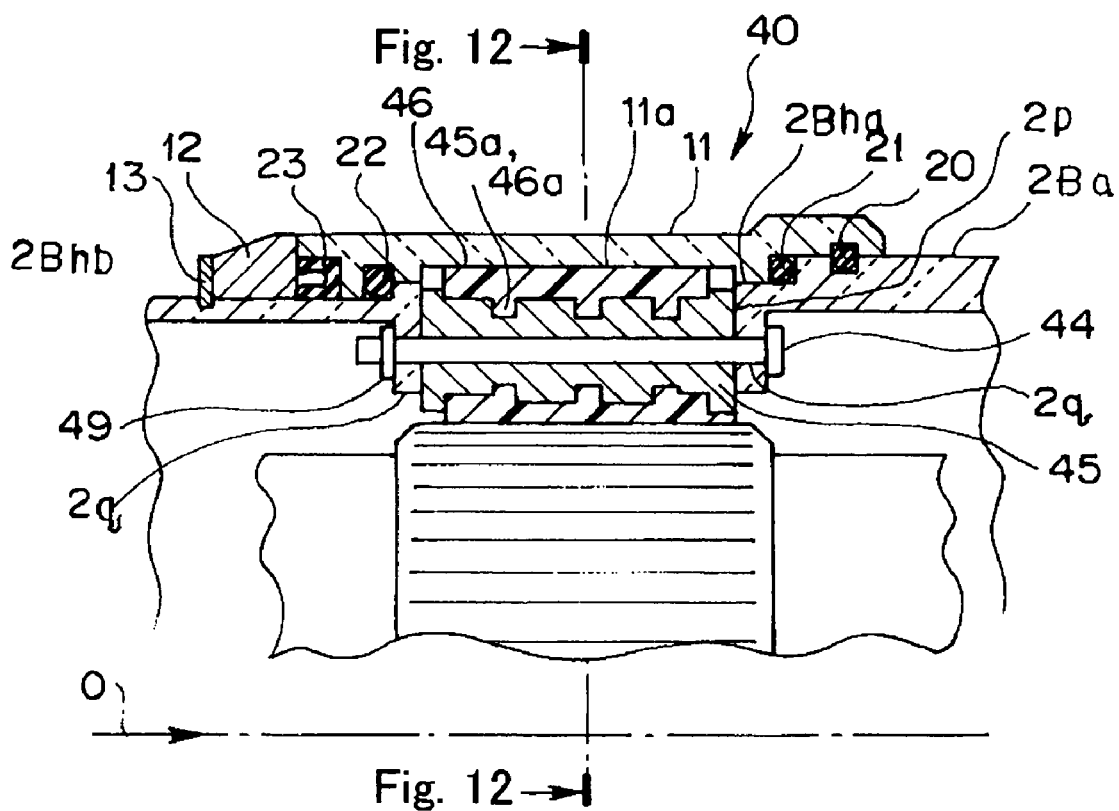
FIG. 11 is a cross-sectional view of FIG. 10, taken along an optical axis of the cylindrical barrel storage section in FIG. 10.
Figure 12:
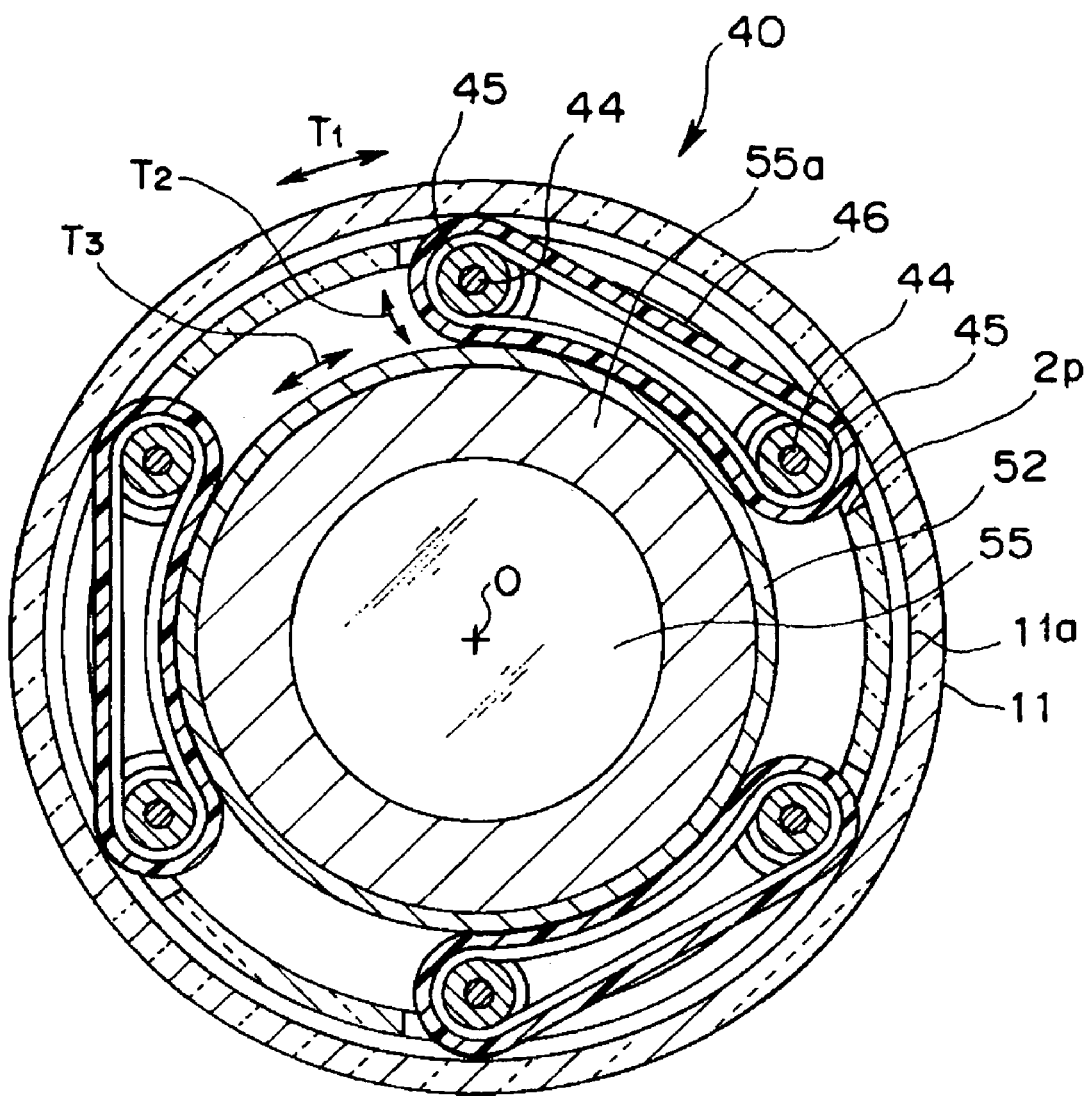
FIG. 12 is a cross-sectional view of FIG. 11, taken along the line orthogonal to the optical axis of the cylindrical lens barrel storage section in FIG. 10.

Referring now to FIG. 10 to FIG. 12, a waterproof housing according to a second embodiment of the present invention will be described.

FIG. 10 is an exploded perspective view of a cylindrical lens barrel storage section (including the rotation transmitting mechanism unit) of a waterproof housing in this embodiment (however, the operation ring is not shown in the drawing). FIG. 11 is a cross-sectional view of FIG. 10, showing a cross-section taken along an optical axis of the cylindrical lens barrel storage section. FIG. 12 is a cross-sectional view of FIG. 11, showing a cross-section taken along a line orthogonal to the optical axis of the cylindrical lens barrel storage section.

The waterproof housing in this embodiment is, as in the case of the waterproof housing 1 of the first embodiment, for storing the single-lens reflex camera in the waterproofed state for enabling photographing and reproducing under water. The waterproof housing of this embodiment is different in structure of a rotation transmitting mechanism unit 40 for rotating the zoom ring 52 by the operation ring 11 with respect to the waterproof housing 1, and other structures are the same as those in the first embodiment. Those same structures are represented by the same reference numerals and only different portions will be described below.

As shown in FIG. 10, a cylindrical barrel storage section 2Ba of the waterproof housing in this embodiment is provided with the rotation transmitting mechanism unit 40 for rotating the zoom ring 52 and the zoom ring 52 of the lens barrel 51 is positioned in the inner peripheral portion. As shown in FIG. 10 and FIG. 11, the cylindrical barrel storage section 2Ba is provided with a water-proof O ring groove 2m, an outer peripheral portion 2Bha, as the outer peripheral wall formed by a shoulder (smaller diameter side), an outer peripheral portion 2hb formed further by a shoulder (smaller diameter side), and a C-ring groove 2n from the side of mounting the lens barrel. Provided on the outer peripheral portion 2Bha are three openings 2p as holes for communicating the inside and the outside at three positions at regular intervals in the circumference direction, and two pairs of shaft supporting holes 2q are provided at both ends of the openings in the direction of the optical axis O on the inner peripheral sides so as to oppose to each other.

On the other hand, as shown in FIGS. 10 and 11, the rotation transmitting mechanism unit 40 includes a pair of supporting shafts 44 which are members composed on three sets and extending in parallel with the optical axis O (that is, in parallel with the axes of rotation of the zoom ring 52 and the operation ring 11), a pair of pulleys 45, a rubber belt 46 and a stop ring 49 to be rotatably fitted on the supporting shafts 44 as the rotation transmitting member, the operation ring 11 which also has the cylindrical shape like the rotation transmitting mechanism unit 10 in the first embodiment, the thrust ring 12 for constraining the thrust position of the operation ring 11, the C-ring 13, and the O-rings 20, 21, 22 and the waterproof seal 23 as a waterproof portion.

The pulley 45 includes a plurality of grooves 45a along an outer periphery thereof, flanges at both ends thereof, and a through axial hole.

The rubber belt 46 is a member formed of rubber (including synthetic rubber) of a deformable cylindrical shape (belt shape), having a width which can be fitted between the flanges at both ends of the pulley 45, and is formed with a plurality of ridges 46a to be fitted into the grooves 45a on the pulley 45 along an inner periphery thereof.

The rubber belt 46 in a state in which the pair of pulleys 45 are inserted in the inner peripheral portion thereof is, as shown in FIGS. 11 and 12, inserted into each of three openings 2p of the cylindrical barrel storage section 2Ba, and is given with a tension by fitting the supporting shaft 44 inserted through the shaft supporting hole 2q into the pulley 45 so as to be capable of rotation, thereby being supported in the rotatable state.

The operation ring 11 is fitted on the outer peripheral portion 2Bha of the cylindrical barrel storage section 2Ba in a rotatably state. In the fitted state, the surfaces of the rubber belts 46 are pressed against the inner peripheral surface 11a of the operation ring 11 by the outer diameters of the pulleys 45 and come into a frictional contact state. Extended portions of the rubber belt 46 between the pulleys come into abutment with the outer peripheral portion of the zoom ring 52 in a state of being frictional contact by the tension.

As in the case of the rotation transmitting mechanism unit 10, the O-ring 20, the O-ring 21, the O-ring 22 are fitted into the O-ring groove 2m, the outer peripheral portion 2Bha, and the outer peripheral portion 2Bhb of the cylindrical barrel storage section 2Ba, respectively. Then, the waterproof seal 23 is fitted on the inner periphery of the front end portion of the operation ring 11, and the opening 2p is retained in a watertight state with respect to the outside. The operation ring 11 is also constrained in back and forth movement in the direction of the optical axis O as in the case of the rotation transmitting mechanism unit 10.

A state of zooming operation of the lens barrel when the camera is stored in the waterproof housing having the structure as described above will be described.

When the operation ring 11 is rotated in either direction indicated by T1 in FIG. 12 in a state in which the camera is stored, the rotational force is frictionally transmitted to the rubber belts 46 via the inner peripheral surface 11a of the operation ring 11, and the rubber belts 46 rotate in the direction indicated by T2. By the movement of the rubber belts 46, the zoom ring 52 is frictionally driven and is rotated in the direction indicated by T3 which is the opposite direction from the direction T1. As described above, when the rotation of the operation ring 11 is transmitted to the zoom ring 52, the photographic lens 55 of the lens barrel moves back and forth to the respective zoomed positions to achieve zooming.

According to the waterproof housing in this embodiment, as in the case of the first embodiment, the zoom ring 52 of the lens barrel of the stored camera can be rotated via the rotation transmitting mechanism unit 40 without slippage by rotating the operation ring 11 from the outside of the housing whereby zooming operation can be achieved reliably, and the structure of the rotation transmitting mechanism unit 40 is simple. In particular, in the case of this embodiment, since the rubber belt 46 is applied as the operation transmitting member, the transmission of the rotational force is achieved smoothly with good efficiency.

The outside and inside of the openings 2i of the cylindrical barrel storage section 2a in which the operation ring 11 and the rubber belts 46 are rotatably arranged are maintained in a reliable watertight state by the O-rings 20, 21, 22 and the waterproof seal 23 arranged between the inner peripheral portion of the operation ring 11 and the outer peripheral portions 2Bha, 2Bhb of the cylindrical barrel storage section 2Ba.

The operation ring and the rotation transmitting mechanism member in the first and second embodiments are used for rotating the zoom ring. However, the invention is not limited thereto, and the operation ring and the rotation transmitting member can also be applicable as the member for rotating the focus ring.

Figure 13:
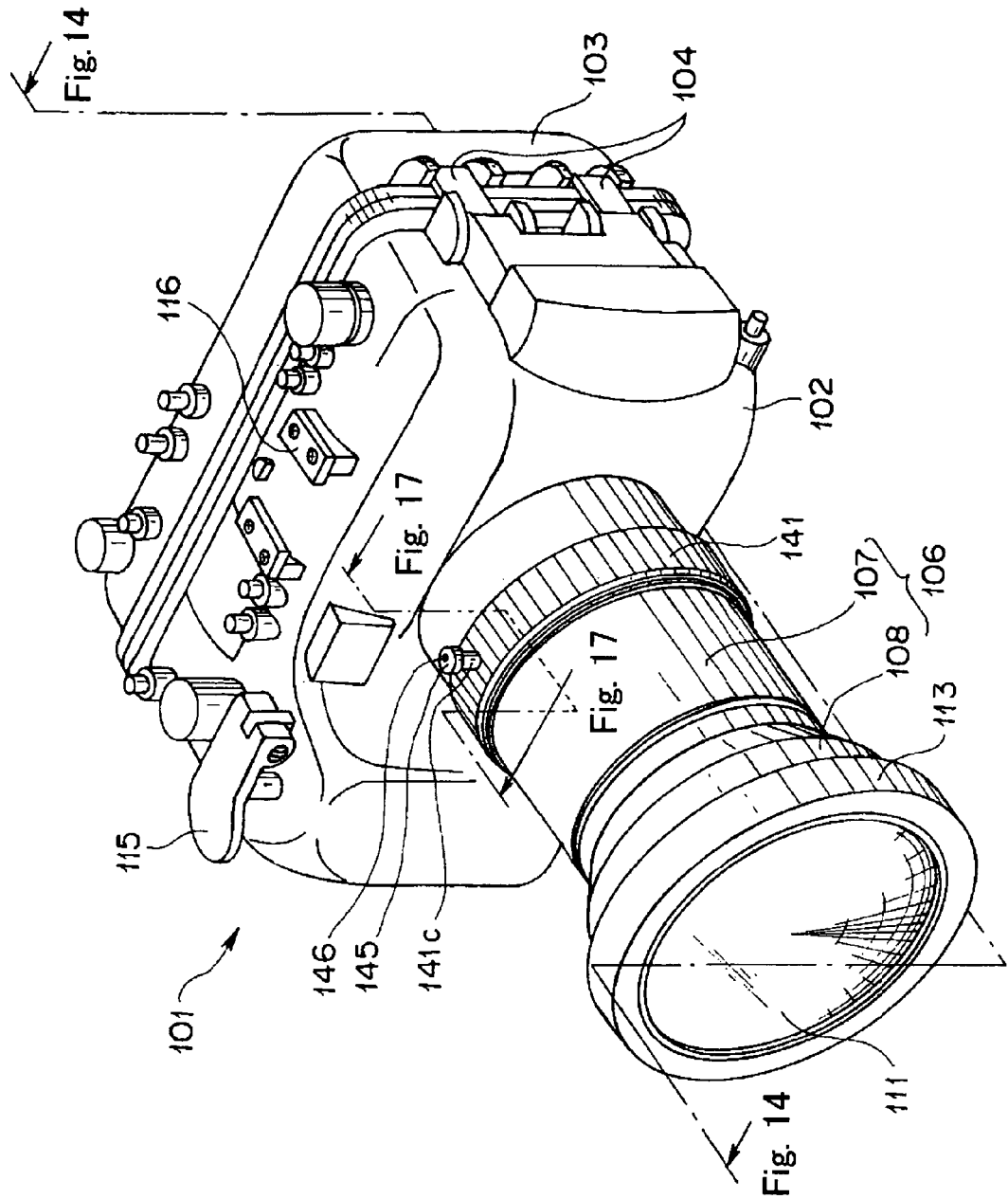
FIG. 13 is a perspective view showing an appearance of a waterproof housing according to a third embodiment of the present invention.
Figure 14:
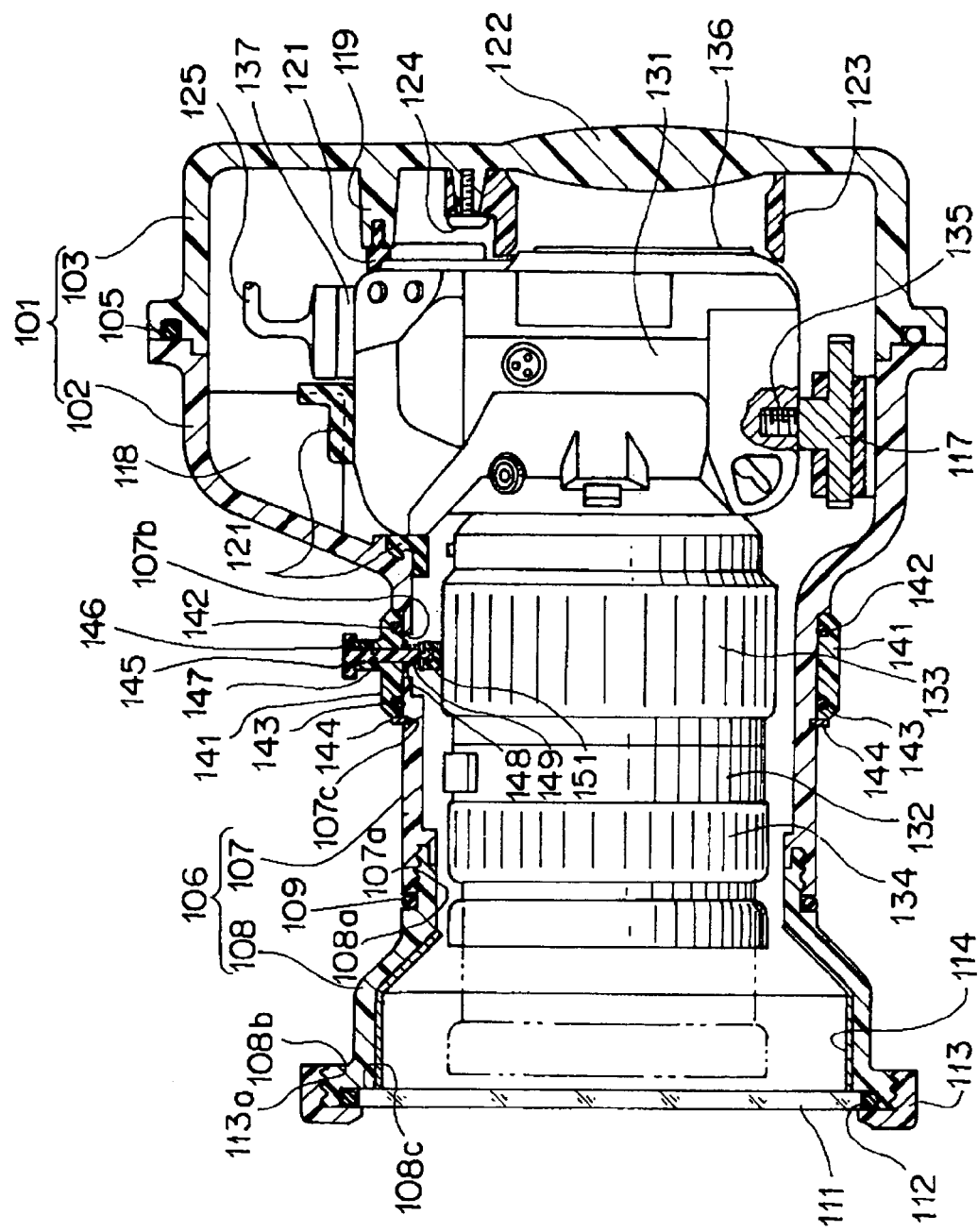
FIG. 14 is a cross-sectional view of FIG. 13 showing a structure of the waterproof housing in a state in which a camera is stored according to the third embodiment.
Figure 15:
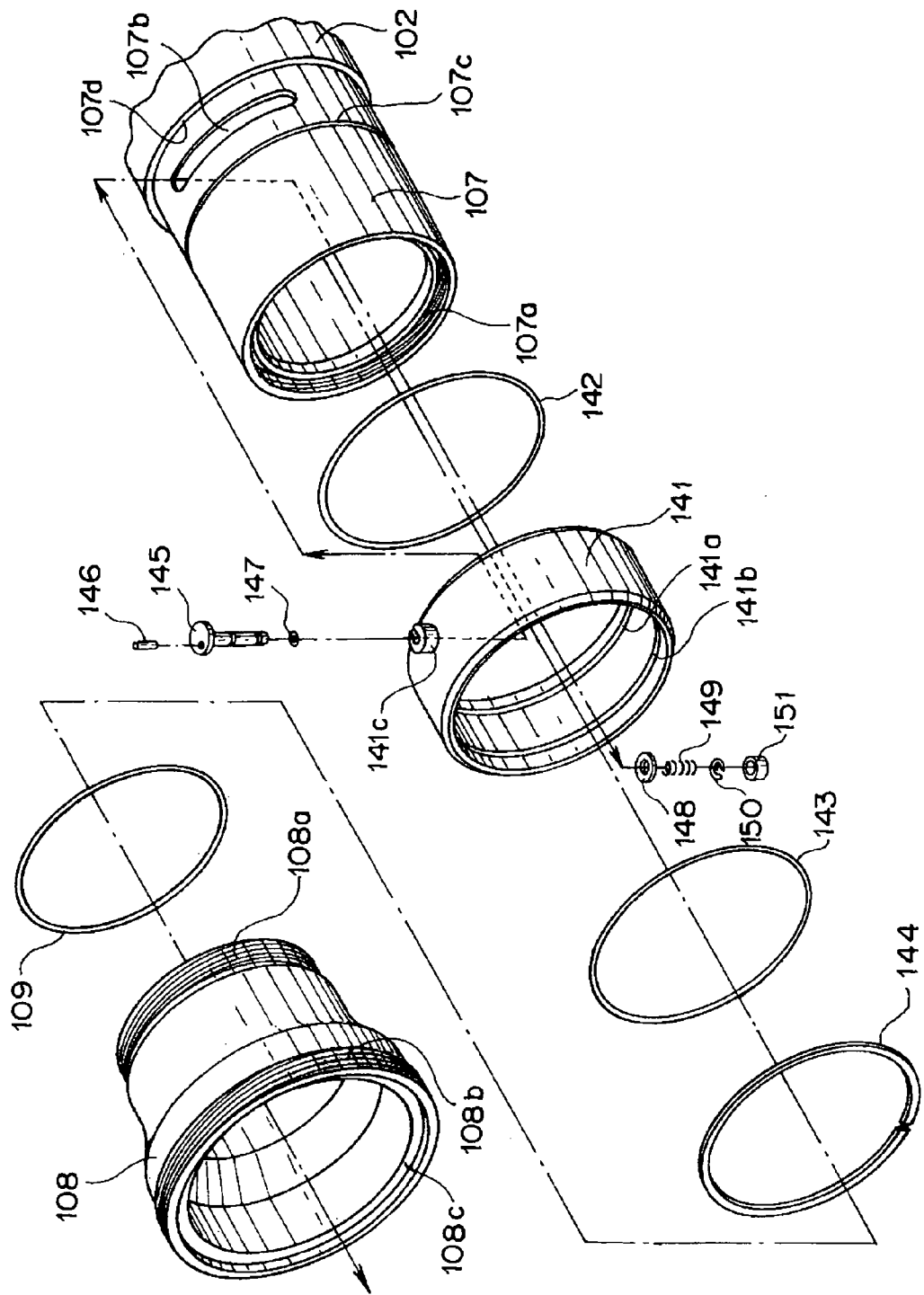
FIG. 15 is an exploded perspective view showing part of the structure of the lens barrel storage section extended in the direction of the optical axis according to the third embodiment.
Figure 16:
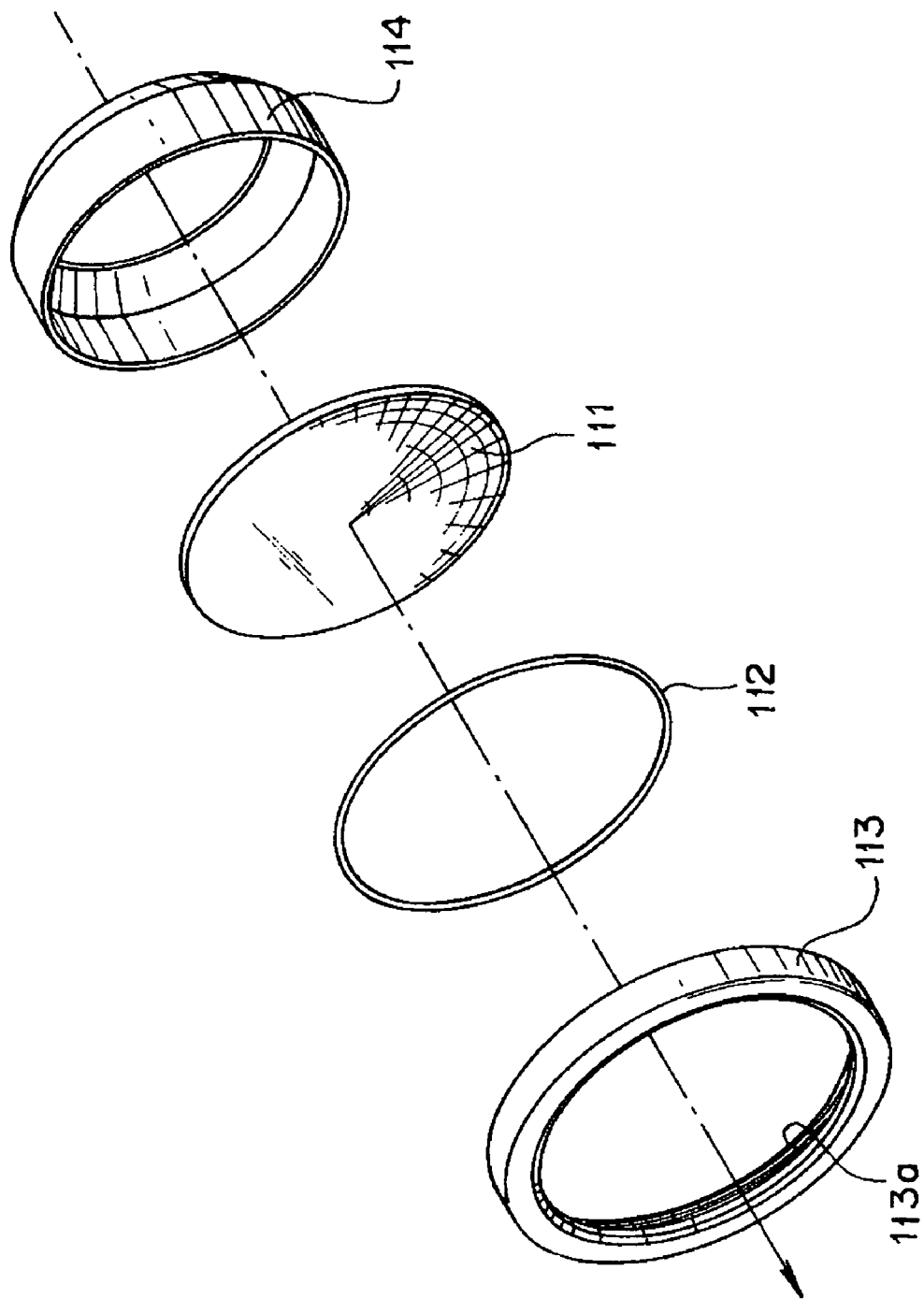
FIG. 16 is an exploded perspective view showing another part of the structure of the lens barrel storage section extended in the direction of the optical axis according to the third embodiment.
Figure 17:
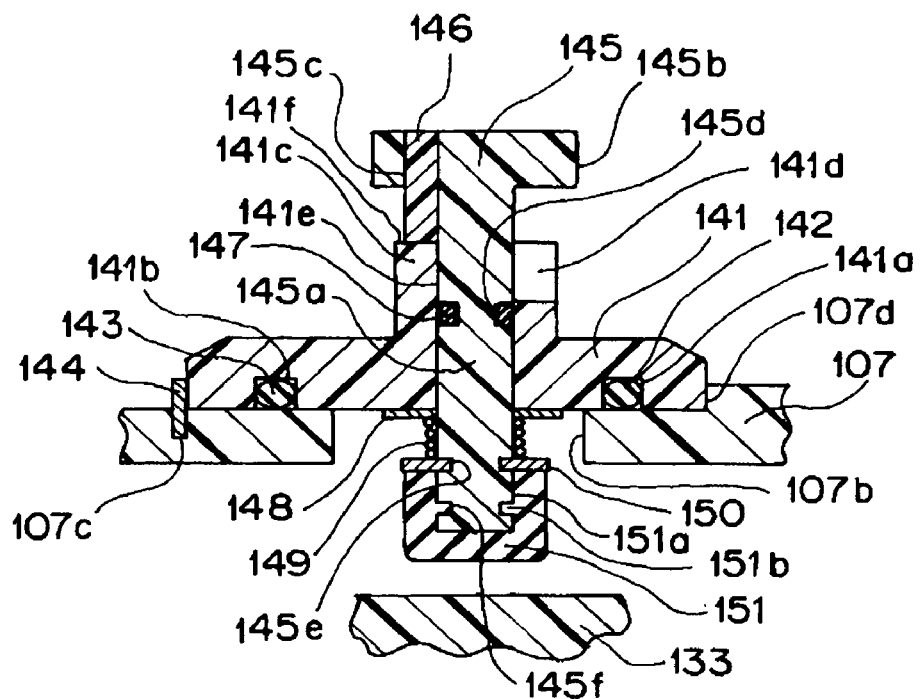
FIG. 17 is a cross-sectional view of FIG. 13 showing a structure of an operation ring rotating mechanism according to the third embodiment.
Figure 18:
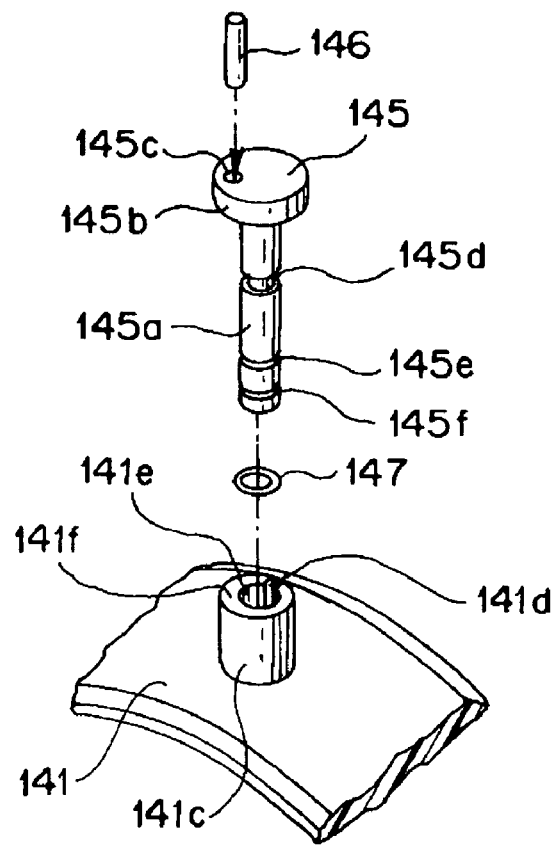
FIG. 18 is a perspective view showing the structure of the operation ring rotating mechanism according to the third embodiment.

FIG. 13 to FIG. 18 show a third embodiment of the present invention. FIG. 13 is a perspective view showing an appearance of the waterproof housing; FIG. 14 is a cross-sectional view of FIG. 13 showing a structure of the waterproof housing in a state in which the camera is stored; FIG. 15 is an exploded perspective view showing part of a structure of the lens barrel storage section extended in the direction of the optical axis; FIG. 16 is an exploded perspective view showing another part of the structure of the lens barrel storage section extended in the direction of the optical axis; FIG. 17 is a cross-sectional view of FIG. 13 showing a structure of an operation ring rotating mechanism; FIG. 18 is a perspective view showing the structure of the operation ring rotating mechanism.

Referring now to FIG. 14, a general structure of a camera 131 stored in the waterproof housing will be described.

The camera 131 is configured as a digital camera, for example, of a single-lens reflex type in which a lens is replaceable, and is provided with a lens barrel 132 extending toward the front.

The lens barrel 132 has a function to hold a photographic lens, not shown, and includes a zoom ring 133 as an operation ring for adjusting the focal distance of the photographic lens, and a focus ring 134 as an operation ring for adjusting a focus position of the photographic lens. The zoom ring 133 and the focus ring 134 are each provided with, for example, a rubber ring for operation on an outer peripheral side, and the rubber ring is formed on an outer peripheral surface with a plurality of grooves for facilitating the rotational operation by the user at regular intervals. The camera 131 is provided with a tripod stand screw hole 135 on a bottom surface thereof for attaching the camera to the tripod stand. The camera 131 is provided with a display screen 136 for framing at the photographing time and displaying photographed images after photographing, or displaying various sorts of information relating to the camera. The camera 131 is provided with a flash lamp shoe 137 for mounting an external flash thereto so as to be detachable on an upper surface thereof.

Subsequently, referring to FIG. 13 and FIG. 14, the structure of a waterproof housing 1 for storing the camera 131 configured as described above will be described.

The waterproof housing 101 is configured in such a manner that a front case 102 and a rear case 103 are supported by a hinge or the like so as to be capable of opening and closing, and to be brought into a hermetical state by engaging a buckle 104. The front case 102 and the rear case 103 are adapted to be secured in a watertight state via an O-ring 105. The waterproof housing 101 is totally formed of transparent material such as polycarbonate in general, and pivotal points have a color which is viewable even under water, such as red, for example. As described later, portions requiring light shielding are attached with light shielding members as needed.

An upper surface of the front case 102 is provided with various operating members such as a release lever 115 for making a release button, not shown, that can be pushed from the outside on the camera 131, and an external flash lamp shoe 116 for mounting an underwater flash lamp for irradiating illuminating light at the time of photographing.

The front case 102 is provided with a lens barrel storage section 106 for storing the lens barrel 132 of the camera 131 projecting toward the front. The lens barrel storage section 106 includes a cylindrical portion 107 of substantially cylindrical shape projecting integrally with the front case 102, a hood ring 108 to be integrally screwed into the cylindrical portion 107, an O-ring 109 interposed between the cylindrical portion 107, and the hood ring 108 for maintaining a watertight state. The cylindrical portion 107 is formed with an inner diameter screw 107a at a distal end side and the hood ring 108 is formed with an outer diameter screw 108a on a rear end side, respectively, so that the cylindrical portion 107 and the hood ring 108 can be mounted integrally in the watertight manner by placing the O-ring 109 therebetween screwing them together.

An operation ring 141 as described later is rotatably mounted to an outer peripheral side of the cylindrical portion 107 in a watertight manner via O-rings 142, 143 as the first waterproof portions, and a stop ring 144 for preventing the operation ring 141 from doming off is fitted to the cylindrical portion 107 from a distal end side of the operation ring 141.

The lens barrel 132 assumes a position such that a distal end portion including the first group lens is located as shown by a solid line in FIG. 14 in a Wide state, and when it is in a Tele state, the distal end portion is protruded to a position shown by a double-dashed line in FIG. 14. Therefore, the hood ring 108 is configured to assume a shape which can store the lens barrel 132 in any state from the Wide state to the Tele state. The hood ring 108 is provided with a light-shielding member 114 attached on an inner surface side thereof, so as to serve also as a lens hood which cuts unnecessary outside light. The hood ring 108 is configured to function specifically effectively as the lens hood as shown in the drawing in the Wide state shown by a solid line in FIG. 14.

A shoulder 108c is formed on an inner peripheral surface on a distal end side of the hood ring 108, so that a front glass 111 can be attached to the shoulder 108c via a O-ring 112. An outer diameter screw 108b is formed on an outer peripheral surface of the distal end side of the hood ring 108, and an inner diameter screw 113a is formed on an inner peripheral side of a stop ring 113. By screwing the inner diameter screw 113a of the stop ring 113 from a front side of the front glass 111 onto the outer diameter screw 108b of the hood ring 108, the front glass 111 and the O-ring 112 are fixed to the shoulder 108c, so that the watertight property on a front side of the lens barrel storage section 106 is secured.

A tripod stand screw 117 is provided on a bottom surface side in the front case 102, so that the camera 131 is fixed to the front case 102 by being screwed into the tripod stand screw hole 135 of the camera 131.

A rib 118 and a rib 119 are formed so as to project from an upper front side in the front case 102 and the inside of the rear case, and abutment rubbers 121 are provided at distal ends of the ribs 118, 119 or the several spots in the waterproof housing 101 which come into abutment with the camera 131 when the camera 131 is stored in the waterproof housing 101. By bringing the abutment rubbers 121 into abutment with the camera 131, the camera 131 is three-dimensionally positioned in the waterproof housing 101 together with the tripod stand screw 117.

A back surface side of the rear case 3 is integrally provided with a screen magnifier 122 for observing the display screen 136 on a back surface side of the camera 131 in an enlarged scale. An in-screen hood 123 having light-shielding property is attached to an inner surface side of the rear case 103 with a screw 124 so as to surround the screen magnifier 122. Therefore, the display screen 136 can be observed clearly in the enlarged scale while alleviating the effect of the outside light.

The flash lamp shoe 137 on the camera 131 is adapted so that one end of a synchro-cord 125 is connected. The other end of the synchro-cord 125 is connected to the external flash lamp shoe 116 provided on the waterproof housing 101. Accordingly, with the underwater flash lamp mounted to the external flash lamp shoe 116, if the flash lamp is set to the flash mode, light from the underwater flash lamp is emitted synchronously with shutter release by the operation of the release lever 115.

Subsequently, referring to FIG. 15 and FIG. 17, an operation ring rotating mechanism for rotating the zoom ring 133 of the camera 131 from the outside of the waterproof housing 101 will be described.

The cylindrical portion 107 is formed with a through hole 107b formed as a circumferential hole of a predetermined length extending in the circumferential direction and a stop ring groove 107c formed of a circumferential groove for fitting the stop ring 144 in addition to the inner diameter screw 107a. The cylindrical portion 107 is formed with a shoulder 107d on a proximal end side, and the shoulder 107d serves as an end wall when the operation ring 141 is fitted into the cylindrical portion 107.

The operation ring 141 is a short cylindrical ring member to be rotatably fitted on the outer peripheral side of the cylindrical portion 107, and two O-ring grooves 141a, 141b as circumferential grooves for mounting the O-rings 142, 143 respectively are formed on an inner peripheral side. The O-ring grooves 141a, 141b are provided at positions that sandwich the through hole 107b in the direction of the optical axis when the operation ring 141 is fitted on the outer periphery of the cylindrical portion 107.

The operation ring 141 is rotatable in the circumferential direction in a state of being interposed between the shoulder 107d and the stop ring 144 by fitting the stop ring 144 into the stop ring groove 107c in the state in which an end surface on a proximal side is in abutment with the shoulder 107d.

A boss 141c is provided on the outer peripheral side of the operation ring 141 so as to project therefrom, and a shaft hole 141e is provided in the boss 141c. A position pin fitting notch 141d as a position deciding portion is provided at an end of the boss 141c.

A press-contact pin 145 as a press-contact member, a position pin 146 as a position deciding portion, an O-ring 147 as a second waterproof portion, a washer 148, a coil spring 149 as an urging member, an E-ring 150, and an abutment rubber 151 as a press-contact member are assembled to the shaft hole 141e provided on the boss 141c of the operation ring 141.

The press-contact pin 145 includes a shaft portion 145a to be fitted to the shaft hole 141e so as to be capable of being replaced in the axial direction, and a head portion 145b provided integrally with an upper end side of the shaft portion 145a so as to be capable of being rotated by a finger or the like. A position pin fitting hole 145c for integrally fitting the position pin 146 is formed on the head portion 145b of the press-contact pin 145. The position pin 146 is fitted into the position pin fitting notch 141d according to the position about the axis of the press-contact pin 145 for allowing displacement of the press-contact pin 145 in the axial direction. A shaft portion 45a of the press-contact pin 145 is formed with an O-ring groove 145d formed of a peripheral groove for mounting the O-ring 147, and an E-ring groove 145e for fitting the E-ring 150, and a drop-off preventing groove 145f for preventing the abutment rubber 151 from dropping off.

A distal end side of the press-contact pin 145 is projecting toward the inner peripheral side of the operation ring 141, and the washer 148, the coil spring 149, the E-ring 150, and the abutment rubber 151 are mounted to the projecting portion in this order.

The coil spring 149 is interposed between the washer 148 and the E-ring 150 in a compressed state, and always urges the press-contact pin 145 toward the zoom ring 133.

The abutment rubber 151 is formed with an axial hole 151a for press-fitting a distal end portion of the press-contact pin 145, and an inner flange 151b for preventing drop-off is provided in the axial hole 151a. The inner flange 151b serves to prevent the abutment rubber 151 from dropping off the press-contact pin 145 by being engaged with the drop-off preventing groove 145f of the press-contact pin 145.

Subsequently, the effect when rotating the zoom ring 133 of the camera 131 by the operation ring rotating mechanism of the waterproof housing 101 will be described.

The press-contact pin 145 is adapted to be different in axial position depending on the rotated position about the axis. In other words, in a state in which the position pin 146 is in abutment with an upper end surface 141f of the boss 141c, the abutment rubber 151 at the distal end of the press-contact pin 145 is at a position apart from (separate positions) the zoom ring 133 (see FIG. 17).

When the user wants to operate the zoom ring 133, he/she rotates the press-contact pin 145 about the axis with his/her fingers or the like. Then, he/she aligns the position pin 146 and the position pin fitting notch 141d about the axis. Then, insertion of the position pin 146 into the position pin fitting notch 141d is enabled, and the press-contact pin 145 is displaced toward the inside of the lens barrel storage section 106 along the axial direction by an urging force of the coil spring 149 in the compressed state. Then, the abutment rubber 151 at a distal end comes into press contact with the zoom ring 133, and stops (press-contact position) (see FIG. 14). In this sate, the position pin 146 takes a position being inserted into the position pin fitting notch 141d.

When the user rotates the operation ring 141 along an outer periphery of the lens barrel storage section 106 in this state, the zoom ring 133 is rotated about the optical axis of the lens barrel 132.

Although the zoom ring 133 is adapted to be rotated by the static frictional force between the abutment rubber 151 and the zoom ring 133 which is generated by an urging force of the coil spring 149 in this example, it is also possible to adapt the same to be rotated by the pressing force applied to the press-contact pin 145 by the user in addition to the urging force of the coil spring 149. In this case, the amount of force provided by the coil spring 149 can be reduced, and hence the spring providing a general amount of force can be used. Therefore, the cost can be reduced in comparison with the case in which a specific part is employed.

The operation ring 141, and hence the zoom ring 133 are rotated to a desired position, the user pulls up the press-contact pin 145 by, for example, picking the head portion 145b with his/her fingers, until the position pin 146 comes out of insertion into the position pin fitting notch 141d. Then, he/she rotates the press-contact pin 145 in the pulled state about the axis so that the position pin 146 is brought into abutment with the upper end surface 141f of the boss 141c. Accordingly, the position pin 146 is restored to the separate position as shown in FIG. 17.

According to the third embodiment as described thus far, since the zoom ring 133 is adapted to be rotated by bringing the abutment rubber 151 into abutment with the zoom ring 133, operation ring can be reliably operated in comparison with the example in the related art in which the magnet force is used.

Since the user can rotate the zoom ring 133 by rotating the operation ring 141, the operating state is the same as the case of rotating the zoom ring 133 itself of the camera 131, and hence it is convenient with unified operability.

Both of the operation to insert the position pin 146 into the position pin fitting notch 141d and the operation to pull up the position pin 146 from the position pin fitting notch 141d can be performed in air. In other words, a diver or the like can insert the position pin 146 into the position pin fitting notch 141d before entering water, and pull the position pin 146 from the position pin fitting notch 141d after having come out from water. Therefore, the diver can perform the zooming operation to a desired position only by rotating the operation ring 141 without performing troublesome operations under water, which is operable and convenient.

Since the press-contact pin 145 can be held at the separate position, the camera 131 having the lend barrel 132 can be dismounted from and mounted to the front case 102 of the waterproof housing 101, and hence is user friendly.

Figure 19:
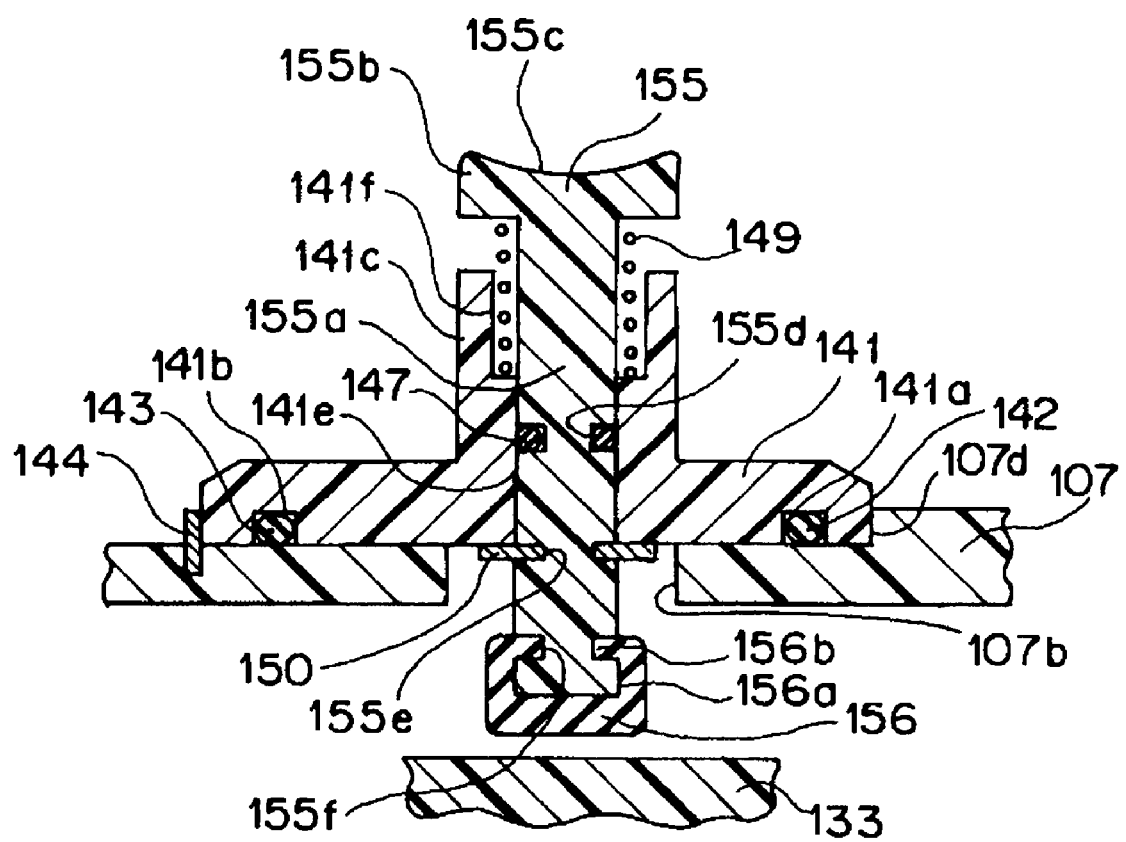
FIG. 19 is a cross-sectional view showing a structure of an operation ring rotating mechanism according to a fourth embodiment of the present invention.

FIG. 19 shows a fourth embodiment of the present invention. FIG. 19 is a cross-sectional view showing a structure of the operation ring rotating mechanism. In the fourth embodiment, the same parts as in the above-described third embodiment, being represented by the same reference numerals, are not described here, and only different parts will be described.

In the third embodiment, the press-contact pin 145 is constantly urged by the spring 149 in the direction to be brought into abutment with the zoom ring 133. However, in the fourth embodiment, the press-contact pin 155 as the press-contact member is constantly urged by the spring 149 in the direction to be brought out of contact from the zoom ring 133.

In other words, a press-contact pin 155 includes a shaft portion 155a to be fitted into the shaft hole 141e so as to be capable of displacement in the axial direction, a head portion 155b provided integrally with the shaft portion 155a on an upper end side and adapted to be pressed with a finger or the like. An upper end surface 155c of the head portion 155b of the press-contact pin 155 is formed into a concave surface so as to be easy to press with the finger or the like. The shaft portion 155a of the press-contact pin 155 is formed with an O-ring groove 155d which is a circumferential groove for attaching the O-ring 147, an E-ring groove 155e for fitting the E-ring 150, and a drop-off preventing groove 155f for preventing an abutment rubber 156 as the press-contact member from dropping off.

The abutment rubber 156 is formed with a shaft hole 156a for press-fitting a distal end portion of the press-contact pin 155, and an inner flange 156b for preventing drop-off is provided in the shaft hole 156a. The inner flange 156b has a function to prevent the abutment rubber 156 from dropping off the press-contact pin 155 by engaging with the drop-off preventing groove 155f of the press-contact pin 155.

The boss 141c in this embodiment is not provided with the position pin fitting notch 141d, and is provided with a spring insertion shoulder 141f on the side of an upper end opening instead. Then, the coil spring 149 is disposed in the spring insertion shoulder 141f in the state of being inserted into the shaft portion 155a of the press-contact pin 155. The coil spring 149 is in a compressed state by being engaged at a lower end side with the spring insertion shoulder 141f, and at an upper end side with a lower end surface of the head portion 155b of the press-contact pin 155.

Subsequently, an operation when rotating the zoom ring 133 of the camera 131 by the operation ring rotating mechanism of the waterproof housing 1 will be described.

The press-contact pin 155 is constantly urged by the coil spring 149 in the direction to come apart from the zoom ring 133 when an external force is not applied. Therefore, in this state, the abutment rubber 156 at the distal end of the press-contact pin 155 is at a position apart from the zoom ring 133 (separate position).

When the user presses the press-contact pin 155 with his/her fingers or the like against the urging force of the coil spring 149 in this state, the press-contact pin 155 is displaced inwardly of the lens barrel storage section 106 along the axial direction. Then, when the abutment rubber 156 at a distal end comes into press contact with the zoom ring 133, displacement is stopped (press-contact position).

When the user rotates the operation ring 141 along an outer periphery of the lens barrel storage section 106 while keeping the press-contact pin 155 pressed in this state, the zoom ring 133 is rotated about the optical axis of the lens barrel 132.

In the structure described above, the operation to press the press-contact pin 155 is inevitable for rotating the zoom ring 133. However, the present invention is not limited thereto, and may be adapted to provide a locking mechanism for maintaining the abutment rubber 156 in abutment with the zoom ring 133. In this case, by bringing the abutment rubber 156 into abutment with the zoom ring 133 by the locking mechanism before entering water, the user can perform the zooming operation by rotating the operation ring 141 itself under water. Since the locked state by the locking mechanism can be released after having come out from water, the operation under water can be facilitated.

Since water pressure is excited to the press-contact pin 155 under water as a matter of course, the coil spring 149 that may be used here is the one provided with an urging force that can resist the water pressure exerted to the press-contact pin 155.

In contrast, by configuring in such a manner that the amount of force of the water pressure exerted to the press-contact pin 155 exceeds the urging force of the coil spring 149 at a predetermined water depth or deeper, a structure such that the abutment rubber 156 attached to the press-contact pin 155 comes into abutment with the zoom ring 133 automatically at a predetermined water depth or deeper is achieved. In this case, a structure in which the user need not to press the upper end surface 155c of the press-contact pin 155 at a second water depth which is deeper than the predetermined water depth, and may achieve the zooming operation by only operating the operation ring 141 is also possible. In other words, since the amount of force of the water pressure is proportional to the cross sectional area which is vertical to the axis of the shaft hole 141e, the shaft hole 141e and the press-contact pin 155 may be designed so as to be capable of obtaining the required amount of force. When such a structure is employed, the press-contact pin 155 moves apart from the zoom ring 133 automatically by the urging force of the coil spring 149 in the air, and the press-contact pin 155 comes into abutment with the zoom ring 133 automatically by the water pressure under water at a predetermined depth or deeper.

According to the fourth embodiment, the same effects as the third embodiment can be achieved by urging the press-contact pin 155 so as to be kept constantly apart from the zoom ring 133. In comparison with the third embodiment, the number of components can be reduced to reduce the cost.

In the fourth embodiment as well, dismount and mount of the camera having the lens barrel 132 from/to the front case 102 are facilitated.

Although the example in which the zoom ring 133 as the operation ring is rotated has been described in the embodiments described above, the invention is not limited thereto, and it is also possible to adapt to rotate the focus ring 134 in the same mechanism.

Although the digital camera has been exemplified as a camera, the invention is not limited thereto, and it can be applied widely to devices that are provided with a lens barrel having the operation ring provided thereon, and, for example, it can be applied to a video camera and the like as a matter of course.

The present invention is not limited to the embodiments described above, and various modifications and applications may be made without departing the scope of the invention as a matter of course.

The present invention can be utilized for the waterproof housing in which the device provided with the lens barrel having an operation ring can be stored.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A waterproof housing for storing a camera having a lens barrel comprising:
   a cylindrical lens barrel storage section for storing part of the lens barrel having a through hole which communicates the outside and the inside of the waterproof housing and
   a rotatable cylindrical operation ring supported on an outer periphery of the cylindrical lens barrel storage section and provided so as to enclose an outer periphery of a rotary ring on the stored lens barrel for rotating the same;
   a transmitting member provided in the through hole formed on an outer peripheral wall of the cylindrical lens barrel storage section to be connected to the rotary ring for directly transmitting rotation of the operation ring thereto; and
   a waterproof member provided between the outside of the cylindrical lens barrel storage section and an inner periphery of the operation ring for achieving waterproof between the inside and the outside of the cylindrical lens barrel storage section.

2. The waterproof housing according to claim 1, wherein the waterproof member comprises a pair of waterproof members, arranged longitudinally of the cylindrical lens barrel storage section so as to sandwich the through hole.

3. The waterproof housing according to claim 1, wherein the transmitting member is a rotary member and may be arranged in the through hole so as to be rotated in contact with the rotary ring and the operation ring.

4. The waterproof housing according to claim 1, wherein the transmitting member is provided on the operation ring so as to rotate with the operation ring in contact with the rotary ring.

5. A waterproof housing for storing a camera having a lens barrel, comprising:
   a cylindrical lens barrel storage section for storing a portion of the lens barrel;
   a rotatable cylindrical operation ring having an axis of rotation in parallel with an axis of rotation of a rotary ring of the lens barrel stored therein; for rotating the rotary ring;
   a rotation transmitting member provided in parallel with the axis of rotation of the operation ring and the axis of rotation of the rotary ring so as to be rotatable for transmitting rotation of the operation ring to the rotary ring by being in abutment with an outer periphery of the rotary ring and an inner periphery of the operation ring; in a through hole formed on the outer peripheral wall of the cylindrical lens barrel storage section and
   a waterproof member provided between the outside of the cylindrical lens barrel storage section and the inner periphery of the operation ring for achieving waterproof between the inside and the outside of the cylindrical lens barrel storage section.

6. The waterproof housing according to claim 5, wherein the rotation transmitting member is formed of a cylindrical rubber member.

7. The waterproof housing according to claim 5, wherein the rotation transmitting member comprises one cylindrical member formed of a rubber member and two pulleys, and is configured to support the inner periphery of the one cylindrical member by the two pulleys so that the one cylindrical member rotates around the two pulleys, and the rotary ring is rotated by an outer periphery of the one cylindrical member.

8. A waterproof housing that can store a device provided with a lens barrel having an operation ring comprising:
   a storage section for storing the lens barrel, a lens barrel storage section having a through hole extending along the direction of operation of the operation ring at a position corresponding to the operation ring of the lens barrel in a stored state;
   a ring member arranged on an outer periphery of the lens barrel storage section so as to be rotatable;
   a press-contact member arranged on the ring member and adapted to assume a press-contact position which achieves abutment with the operation ring through the through hole and a separate position apart from the operation ring;
   a first waterproof member arranged between the lens barrel storage section and the ring member for preventing water from entering the waterproof housing through the through hole; and
   a second waterproof member provided between the press-contact member and the ring member for preventing water from entering the waterproof housing from the through hole.

9. The waterproof housing according to claim 8, further comprising an urging member disposed between the ring member and the press-contact member for constantly urging the press-contact member in the direction to come into abutment with the operation ring.

10. The waterproof housing according to claim 9, further comprising a locating member for positioning the press-contact member at one of the press-contact position and the separate position.

11. The waterproof housing according to claim 8, further comprising: an urging member disposed between the ring member and the press-contact member for constantly urging the press-contact member in the direction to come apart from the operation ring.

* * * * *